United States Patent
Onishi et al.

(10) Patent No.: US 7,659,681 B2
(45) Date of Patent: Feb. 9, 2010

(54) NUMERICAL CONTROLLER

(75) Inventors: Yasushi Onishi, Fujiyoshida (JP);
Tetsuo Hishikawa, Yamanashi (JP);
Keisuke Tsujikawa, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 369 days.

(21) Appl. No.: 11/889,052

(22) Filed: Aug. 8, 2007

(65) Prior Publication Data

US 2008/0054829 A1   Mar. 6, 2008

(30) Foreign Application Priority Data

Aug. 8, 2006   (JP) ............. 2006-215867

(51) Int. Cl.
*G05B 19/18* (2006.01)
(52) U.S. Cl. ............ 318/590; 318/569; 318/601; 318/626
(58) Field of Classification Search .......... 318/560, 318/569, 590, 591, 600, 601, 626, 652
See application file for complete search history.

(56) References Cited

U.S. PATENT DOCUMENTS

| 4,816,196 A * | 3/1989 | Otake .......... 264/40.1 |
| 5,154,935 A | 10/1992 | Kamiguchi et al. |
| 7,049,775 B2 | 5/2006 | Iwashita et al. |
| 2006/0012326 A1 * | 1/2006 | Iwashita et al. .......... 318/645 |
| 2006/0090533 A1 | 5/2006 | Fujibayashi et al. |
| 2006/0169018 A1 * | 8/2006 | Hishikawa et al. .......... 72/351 |
| 2006/0216370 A1 * | 9/2006 | Uchiyama et al. .......... 425/150 |
| 2006/0276927 A1 * | 12/2006 | Uchiyama et al. .......... 700/203 |

FOREIGN PATENT DOCUMENTS

| JP | 3-58821 | 3/1991 |
| JP | 7-132385 | 5/1995 |
| JP | 11-33799 | 2/1999 |
| JP | 2006-7296 | 1/2006 |
| JP | 2006-122944 | 5/2006 |

OTHER PUBLICATIONS

Office Action mailed on May 27, 2008 and issued in corresponding Japanese Patent Application No. 2006-215867.

* cited by examiner

*Primary Examiner*—Bentsu Ro
(74) *Attorney, Agent, or Firm*—Staas & Halsey LLP

(57) ABSTRACT

A servomotor in a numerical controller is controlled by automatically switching to either pressure control or position control in association with the command which is smaller from among a command obtained by performing pressure feedback control and a command obtained by performing position feedback control. When switched to pressure control while moving according to a movement command, the output of the movement command is terminated halfway, and the command in the next block is executed, and pressure control of the next command is immediately started. As a result, a wasteful time is eliminated, and a cycle time of the operation can be shortened.

10 Claims, 13 Drawing Sheets

FIG. 3
```
O0001;
N1 G100 Q10;
N2 G90 G01 X30. F500;
N3 G04 P250;
N4 G91 G01 X-#5101 F240000. ;
N5 G90 G01 X100. F500;
N6 M30;
```
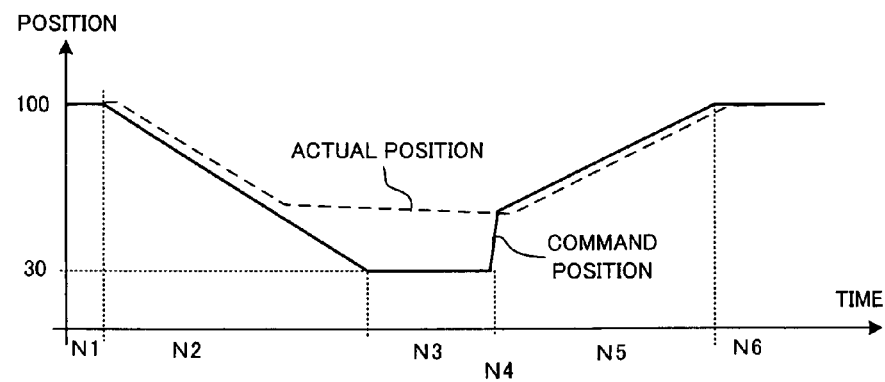
FIG. 4
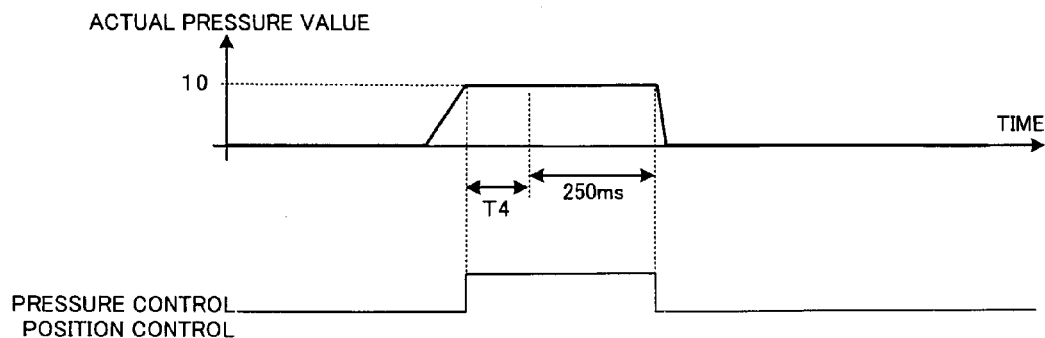
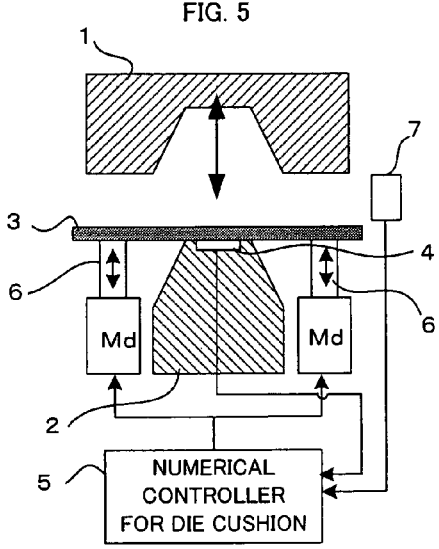
FIG. 5

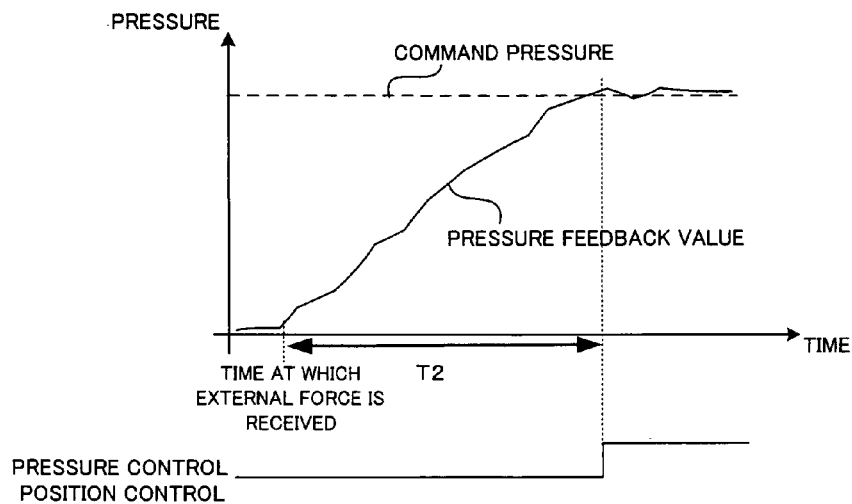
FIG. 6
FIG. 7
```
00001;
N1 G100 Q10;
N2 G01 G91 X-150. F500;
N3 G101 Q100 P15;
N4 G01 G90 X5. F240000. ;
N5 M200;
N6 G90 G01 X300. F500. ;
N7 M30;
```
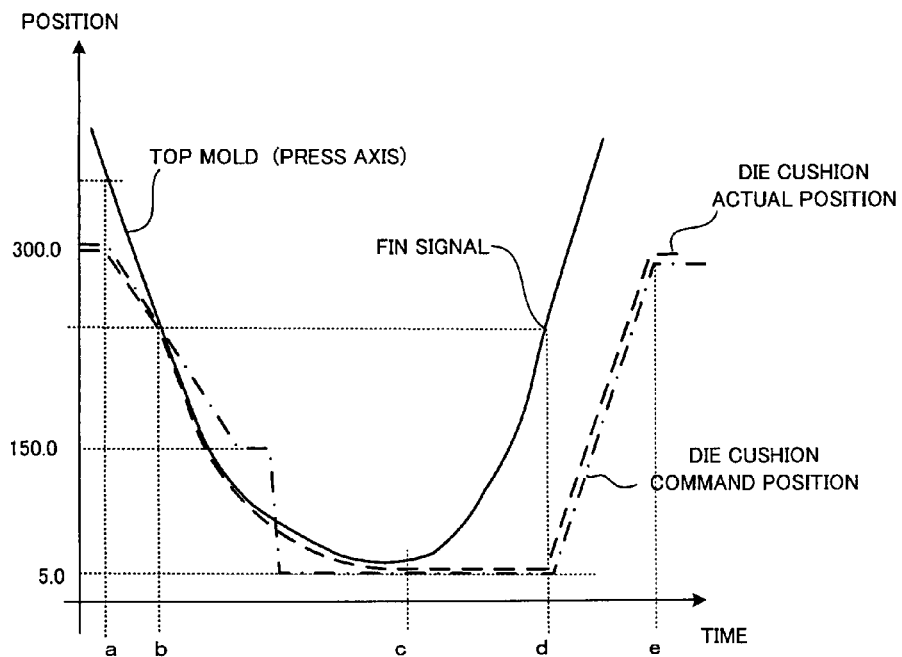
FIG. 8

O0001;
N1 G100 Q10;
N2 G90 G102 X30. F500;
N3 G04 P250;
N4 G91 G01 X-#5101 F240000. ;
N5 G90 G01 X100. F500;
N6 M30;

```
O0001;
N1 G100 Q10;
N2 G90 G102 X30. F500;
N3 G04 P250;
N31 G100 Q20;
N32 G04 P200;
N4 G91 G01 X-#5101 F240000. ;
N5 G90 G01 X100. F500;
N6 M30;
```

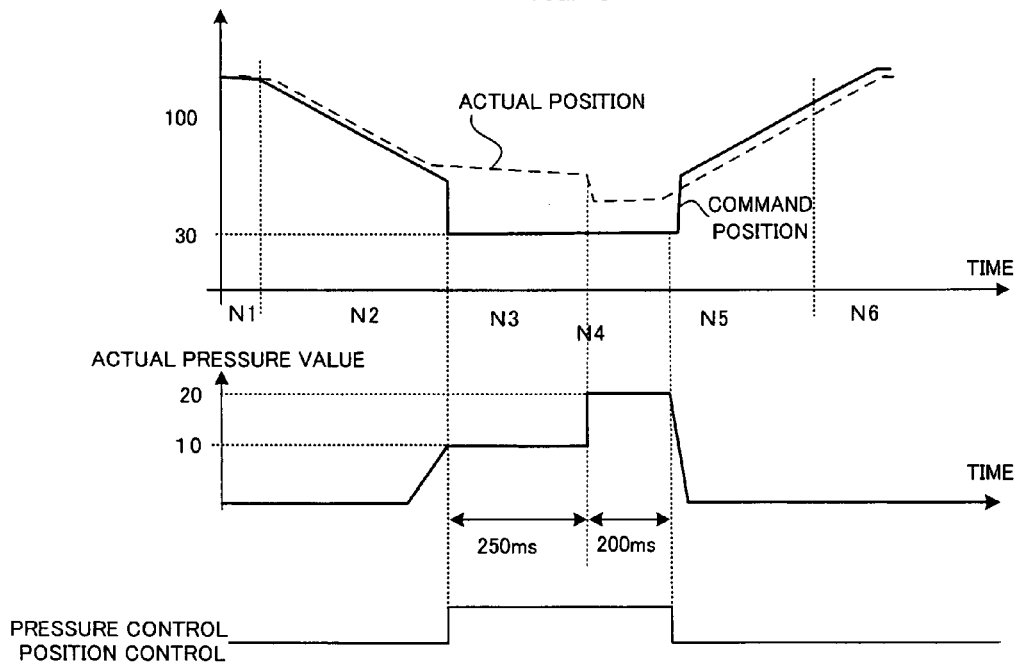
FIG. 18
FIG. 19
```
O0001;
N1 G100 Q10;
N2 G102 G91 X-150. F500;
N3 G101 Q100 P15;
N4 G01 G90 X5. F240000. ;
N5 M200;
N6 G90 G01 X300. F500. ;
N7 M30;
```
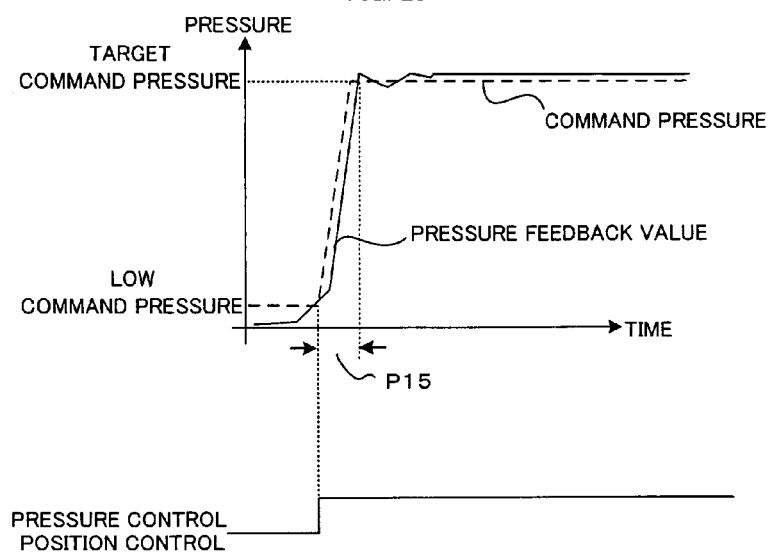
FIG. 20

FIG. 21
```
O0001;
N1 G100 Q10;
N2 G102 G90 X5. F500;
N3 G101 Q100 P15;
N4 M200;
N5 G90 G01 X300. F500. ;
N6 M30;
```
FIG. 22
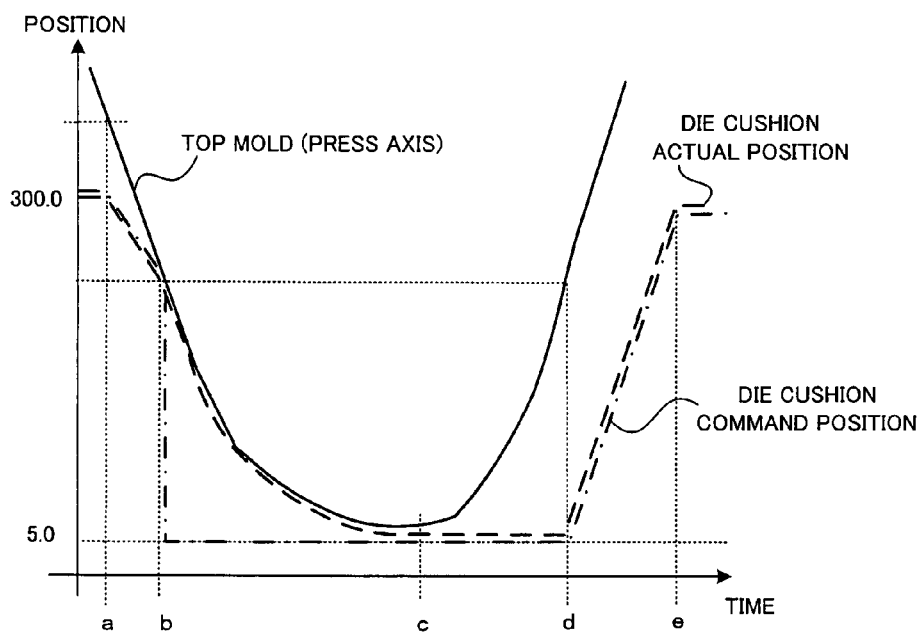
FIG. 23
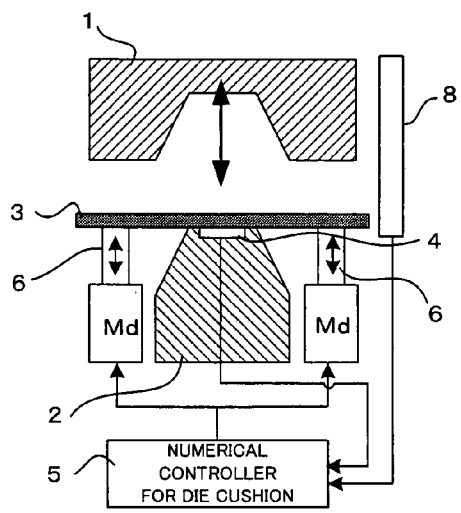

NUMERICAL CONTROLLER

BACKGROUND OF THE INVENTION

1. Field of the Invention

The present invention relates to a numerical controller and method that allows position control and pressure control to be switched over to execute.

2. Description of the Related Art

A numerical controller is generally known, which controls a control object (movable portion driven by a motor) by switching from position control to pressure control or vice versa.

For example, Japanese Patent Application Laid-Open No. 3-58821 (hereinafter, referred to as Patent Document 1) discloses that, in the numerical controller which controls an injection molding machine, it is selectable whether a control at the time of the injection and pressure-holding process is taken as position control to control the position and speed of a screw (movable portion) or pressure control to feedback-control a pressure applied to the screw. According to this technique, at the time of the injection and pressure-holding process, pressure control is performed, and in the metering process following the injection and pressure-holding process, the control is switched over to position control, thereby making it possible to control a position and a speed of the screw.

Further, in a press machine in which a sheet metal (workpiece) is sandwiched by a bottom mold and a top mold fixed to a press axis, and is pressured, thereby processing the sheet metal, a die cushion device is used for the control of the pressure to sandwich the sheet metal by the top mold and the bottom mold, and this die cushion device is controlled by the numerical controller. This is disclosed in Japanese Patent Application Laid-Open No. 2006-122944 (hereinafter, referred to as Patent Document 2). This numerical controller position-controls a servo motor for driving a die cushion member, and holds the bottom mold mounting the metal sheet and the die cushion member at a predetermined position, thereby allowing a press axis to come down. When a position on which the top mold abuts against the metal sheet is detected, by this detection signal, the control of the servo motor which drives the die cushion member is switched over from position control to pressure control so that the die cushion is controlled to the predetermined pressure, thereby performing the press working.

Further, Japanese Patent Application Laid-Open No. 2006-7296 (hereinafter, referred to Patent Document 3) discloses that, in an electric servo press to drive a movable side mold by the servo motor, by using the numerical controller and the like, a speed command determined by the feedback control of a position or a torque command obtained by the feedback control of the position and the speed is compared with a speed command or a torque command determined by the control of a pressure feedback, and a smaller command from among these commands is selected and switched so as to perform a control.

In the techniques disclosed in the above described Patent Documents 1 and 2, a switching timing from position control to pressure control is decided in advance. In the technique disclosed in the Patent Document 1, when the injection and pressure-holding processes are terminated and followed by the next metering process, the control is switched over from pressure control (or position and speed control) to position and speed control, and its switching timing is decided in advance. Further, in the technique disclosed in the Patent Document 2, the switching from position control to pressure control is performed by a signal from a detector for detecting the position of the press axis.

Further, similarly to the technique disclosed in the Patent Document 3, in the technique selecting a smaller command from among the speed command determined by position control and the speed command determined by pressure control, the switching from position control to pressure control can be automatically performed, though the control after the switching cannot be executed immediately.

FIGS. 1A to 1C show an example of a device applying a desired pressure on a part A for a fixed period of time or more after the part A such as a pin is press-fitted into a hole provided in a workpiece W. After the part A is positioned at a press-fit position in a hole provided in the workpiece W (see FIG. 1A), the servo motor M is driven so as to press-fit the part A into the hole of the workpiece W through a feed mechanism B such as a ball screw/nut mechanism. After that, the desired pressure is applied to the part A for a fixed period of time or more (see FIG. 1B), and the part A is fitted and attached to the hole of the workpiece W (FIG. 1C). The driving of this servo motor M requires position control and pressure control, and for this purpose, heretofore, the numerical controller of the configuration as shown in FIG. 2 has been used.

The numerical controller, as shown in FIG. 2, is roughly divided into a numerical control unit 10 and a servo control unit 20.

In the numerical control unit 10, a program analysis processing unit 12 reads in order and analyses the command in each block of a NC program 11, and converts it into execution data, and its result is stored in a block processing unit 13. A position command/pressure command processing unit 14 reads out the execution data for individual blocks from the block processing unit 13, and (1) a distribution processing of the movement amount in the position command and its acceleration/deceleration processing are executed, so that the movement amount for every individual distribution cycle is outputted as a position command to the servo control unit 20, and moreover, (2) the distribution processing of the pressure command (commanded pressure) is performed so that the pressure command is outputted to the servo control unit 20.

Further, in a block termination determination unit 14a, it is determined whether or not the movement amount of the position command in the command in one block currently under execution has all been transferred to the servo control unit. When the movement amount has all been transferred, the block processing unit 13 is notified of the termination of the block processing. That is, the block processing unit 13 is notified of the termination of the execution of the command at the block currently under execution. The block processing unit 13, upon receipt of this block termination notice, delivers the execution data of the command in the next block to the position command/pressure command processing unit 14.

On the other hand, the servo control unit 20 comprises an error counter 21 which constitutes a position loop control unit, a position gain Kp unit 22, a comparator 23, a speed control unit 24, a current control unit 25, and a force gain unit 26 (constituting pressure control unit). A difference (position deviation) between the position command issued from the numerical control unit 10 and a position feedback from a position/speed detector provided in the servo motor and the like is calculated by the error counter 21, and this difference is multiplied by the position gain Kp, thereby obtaining a speed command Ca by position control.

Further, a difference (pressure deviation) between the pressure command outputted from the numerical control unit 10 and the pressure feedback from a pressure sensor is obtained, and this difference is multiplied by the force gain, thereby obtaining a speed command Cb by pressure control. In the comparator 23, the speed command Ca by position control is compared with the speed command Cb by pressure control, and a smaller speed command from among these commands is taken as a speed command to speed control unit 24. In speed control unit 24, from this speed command and a feedback value (not shown) of the speed, the feedback control of the speed is performed, thereby obtaining a torque command (current command) for performing the drive-control of the servo motor.

The configuration of the above described numerical controller is of a well-known type, as disclosed in the above described Patent Document 3.

When the device for press-fitting the part A such as the pin shown in FIG. 1 to the workpiece W is controlled by using the numerical controller as shown in FIG. 1, a NC program as shown in FIG. 3 is prepared, and is executed by the numerical controller. In a program example shown in FIG. 3, [O0001] denotes a program number, [N1 to N6] sequence numbers, [G100] a pressure command, [Q□□] a pressure command, [G90] an absolute command, [G01] a linear interpolation command, [X□□] a command position, and [F□□] a movement speed. [G04] denotes a dwell (stop) command, which holds the state for the time (250) shown by a code P. [G91] denotes an incremental command, and [M30] denotes a command for a program end.

By the block of the sequence number N1, the value (Q10) of a desired pressure is designated. By the block of the sequence number N2, the part A is position-controlled and moved to an insertion target position (X30) toward the workpiece W by a speed (F500). When the part A comes into contact with the workpiece W and the pressure thereof is increased, the servo control unit 20 of the numerical controller is switched over to pressure control, thereby performing a control holding a desired pressure.

The numerical control unit 10 of the numerical controller, whether the control is switched to pressure control or not, executes a movement command in the block of the sequence number N2 till the last. After that, by the block of the sequence number N3, a fixed pressure is further applied for a time (250 msec) designated at P by the G04 command.

In the block of the sequence number N4, a servo position deviation amount accumulated in an error counter 21 of the servo control unit 20 is read out by a variable #5101, and by commanding a value reversing the reference of the read servo position deviation amount, the accumulated servo position deviation amount is made zero with the maximum speed (240000). As a result, the command position coincides with the real position.

After that, the block of the sequence number N5 is executed, and the program is returned to a waiting position (X100.) by position control. The relationship between the position and time and the relationship between the actual pressure and time when this program is executed are as shown in FIG. 4.

As shown in FIG. 4, despite of the command to apply a pressure only for 250 milliseconds at a desired pressure [Q10] at the sequence number N3, pressure control is performed a little extra by a time T4. This is caused by waiting until the movement command at the block of this sequence number N2 is completed, and then, moving to the processing of the block of the next sequence number N3 even when the control is switched over to pressure control during the movement by position control at the block of the sequence number N2. This extra time T4 means a time required for commanding a remaining movement amount by position control, after switching over to pressure control from position control, until completion of the commanding. Moreover, this time T4 is not fixed.

In this manner, even when the control is automatically switched from position control to pressure control at a certain block, the control at the next block is not necessarily executed immediately, so there is a problem that a target control cannot be achieved.

Further, as another example in which the control is made by switching from position control to pressure control, there is a die cushion device in the press machine.

FIG. 5 is a schematic diagram of the die cushion device in the press machine in which a control is made by switching from position control to pressure control.

As shown in FIG. 5, the bottom mold 2 of the mold is fixed to a base of the press machine. Opposing to this bottom mold 2, the top mold 1 is fixed and arranged on the press axis (not shown). The press axis is driven by a motor or a press axis driving source (not shown) using an oil pressure or an air pressure, and the top mold 1 is driven and vertically moved by a fixed operation pattern.

At the side of the bottom mold 2, a plurality of die cushion members 6 driven vertically in the figure by the servo motor Md are provided. In FIG. 5, though an example is shown in which two pairs of the die cushion member 6 and the corresponding servo motor Md for die cushion are provided, the number of pairs may be three or more, and further, the plurality of die cushion members 6 may be connected and integrated, and it may be driven by one servo motor for die cushion. This servo motor Md for die cushion is drive-controlled by the numerical controller 5 for die cushion.

The sheet metal (workpiece) 3 to be pressed is mounted on the die cushion member 6, and is arranged on the bottom mold 2. Further, a pressure sensor 4 for detecting a pressure applied to this sheet metal 3 is provided on the bottom mold 2, and the pressure detected by this pressure sensor 4 is fed back to the numerical controller 5. Further, a sensor 7 such as a limit switch for detecting a position of the top mold 1, that is, a position of the press axis, is provided, and the output of this sensor 7 also is inputted to the numerical controller 5 for die cushion.

For this numerical controller 5 for die cushion, the numerical controller shown in FIG. 2 is used, which controls the servo motor Md by switching over from position control to pressure control or vice versa.

In a state in which the sheet metal 3 to be pressed is mounted on the die cushion member 6 and arranged on the bottom mold 2, the numerical controller 5 outputs a position command to hold the die cushion member 6 at a predetermined position, and moreover, outputs a predetermined pressure command. However, since the die cushion member 6 is held at the predetermined position commanded, the position deviation is "0" or extremely small, and the speed command Ca (see FIG. 2) by position control is "0" or a small value. On the other hand, the sheet metal 3 is not applied with a pressure from the top mold 1, and the pressure detected by the pressure sensor 4 is "0" or an extremely small value. Hence, a difference (pressure deviation) between the command pressure and the detection pressure is great, and as a result, the speed command Cb (see FIG. 2) by pressure control becomes a great value. Hence, the comparator 23 adopts the speed command Ca (Ca<Cb) from position control, thereby performing position control. As a result, the servo motor Md and the die cushion member 6 are held at the command position, and the sheet metal 3 is also held at the predetermined position.

Hence, when the press axis is driven and the top mold 1 comes down and collides against the sheet metal 3, the die cushion member 6 comes down, and the servo motor Md also moves. As a result, the position deviation increases, and the speed command Ca by position control increases. On the other hand, with the top mold 1 colliding against the sheet metal 3, the pressure applied to the pressure sensor 4 increases, and the detection pressure increases. As a result, the pressure deviation decreases, and the speed command Cb by pressure control decreases. As a result, the speed command Cb by pressure control becomes smaller than the speed command Ca by position control (Ca>Cb), and therefore, the comparator 23 selects and adopts the speed command Cb by pressure control, thereby performing pressure control. That is, the content of the position command to the servo motor Md and the die cushion member 6, outputted from the numerical control unit 10, is a position in a state where the top mold 1 and the bottom mold 2 at the press starting time are not abutted on each other (this position is referred to as a press starting position). However, in reality, since the top mold 1 depress the sheet metal 3 and comes down, the position of the servo motor Md is also deviated from the command position. As a result, as far as the top mold 1 continues to come down, the position deviation increases (that is, the speed command Ca by position control gradually increases), and therefore, the speed command Cb (Ca>Cb) by pressure control is adopted, and pressure control is performed.

When the top mold 1 goes up (during this time, the servo motor Md pushes up the die cushion member 6 so as to coincide with the command pressure) and reaches a press starting position, the position deviation becomes "0", so that the comparator 23 is switched over so as to adopt the speed command Ca (Ca<Cb) by position control. Subsequently, position control is performed.

Although the apparatus is operated as described above, when the top mold 1 comes down and collides against the sheet metal 3, there arises a problem that the external force received by this metal sheet 3 from the top mold 1 becomes too great and an overpressure is instantaneously generated.

To prevent this overpressure from arising, position control is performed, immediately before the metal sheet 3 and the die cushion member 6 receive the external force from the top mold 1, to allow the die cushion member 6 to move to escape downward, with the result that a relative speed of the top mold 1 with respect to the die cushion member 6 is lowered, so that a shock (overpressure) at the time of the collision can be diminished. Hence, a state immediately before the top mold 1 abuts against the sheet metal 3 is detected by the sensor 7, and based on the detection result, the numerical control unit 10 (FIG. 2) of the numerical controller 5 starts position control of the servo motor Md, thereby allowing the die cushion member 6 to come down.

FIG. 6 is a view showing a time-shift of a pressure feedback value from the pressure sensor 4 at this time. Since the die cushion member 6 comes down to escape so that the relative speed with respect to the top mold 1 becomes smaller, it takes a long time for the pressure detected by the pressure detector 4 to reach a target pressure. As a result, there arises a problem that the switching from position control to pressure control takes a time T2 (see FIG. 6).

To solve this problem, it is conceivable to perform pressure control, in which a target pressure value is set low at first, thereby advancing the switching point from position control to pressure control, and after switchover to pressure control, a pressure command value is gradually increased.

FIG. 7 is one example of a NC program which includes command to the servo motor Md driving the die cushion member 6 for executing such pressure control. In FIG. 7, [G101] denotes a command for increasing the pressure designated by Q by taking the time designated by P, and [M200] denotes a command of an auxiliary function.

FIG. 8 is a view representing a positional relationship between the top mold 1 (press axis) and the die cushion member 6 when the NC program of FIG. 7 is executed and the servo motor Md is driven to control the die cushion member 6. In this FIG. 8, the axis of abscissas represents time and the axis of ordinates represents position. Further, a solid line shows a position of the top mold 1, a dash-dotted line a command position of the die cushion member, and a broken line an actual position of the die cushion member (position feedback value).

The die cushion member 6 is held (position-controlled) at the position of [300] as a press starting position. The top mold 1 comes down, and at time a, the top mold 1 is detected by the sensor 7, and a detection signal is inputted to the numerical controller 5 from the sensor 7. Then, the numerical control unit 10 of the numerical controller 5 starts the execution of the NC program of FIG. 7.

First, [G100 Q10] of the sequence number N1 is executed, and the pressure command of Q=10 is outputted to the servo control unit 20 from the numerical control unit 10. Subsequently, [G01 G91 X-150. F500] of the sequence number N2 is executed. The numerical control unit 10 obtains a distributed movement amount every distribution cycle so as to move by 150 in a negative direction (coming down) at a speed F=500, and outputs the distributed movement amount to the servo control unit 20. Then, the comparator 23 of the servo control unit 20 compares the speed command Ca by position control with the speed command Cb by pressure control. At first, since the top mold 1 is not abutted on the sheet metal 3, the feedback value from the pressure sensor 4 is small, and as a result, the pressure deviation becomes great and the speed command Cb becomes great. Further, at the initial stage, the die cushion member 6 is held at the press starting position, and the position deviation thereof is small, and as a result, the speed command Ca by position control becomes small. Consequently, because of (Ca<Cb), at first, position control is performed, so that the servo motor Md is driven at the speed F=500, and the die cushion member 6 starts coming down at time a.

Hence, the top mold 1 catches up with the sheet metal 3 and the die cushion member 6, and when the collision of the top mold 1 and the sheet metal 3 occurs at time b, the position deviation becomes great, as described above, and at the same time, the pressure deviation becomes small. Hence, as the speed command Cb by pressure control becomes smaller than the speed command Ca by position control (Ca>Cb), the control is switched to pressure control. The pressure command at this time is Q=10 commanded in the block of the sequence number N1, and pressure control is performed so as to coincide with this pressure Q=10.

In FIG. 9, the broken line shows a command pressure, and the sold line shows a pressure feedback value fed back from the pressure sensor 4. As shown in this FIG. 9, pressure control is performed so as to coincide with the command pressure Q=10. When the distribution processing of the movement amount [−150] commanded in the block of the sequence number N2 is terminated, the position command/pressure command processing unit 14 of the numerical control unit 10 executes the command in the block of the next sequence number N3. During the distribution processing of the movement amount [−150] commanded in the block of the sequence number N2, pressure control is executed at the low pressure of the command pressure Q10.

When the distribution processing of the movement amount [−150] is terminated, the command in the block of the next sequence number N3 is executed. The position command/pressure command processing unit 14 of the numerical control unit 10 performs pressure distribution processing that the pressure increases gradually from the command pressure Q10 to the command pressure Q100 by taking the commanded time P15, and its pressure command is outputted to the servo control unit 20. The servo control unit 20, upon receipt of this pressure command, performs a pressure feedback control, and as shown in FIG. 9, the command pressure is switched over from Q=10 to Q=100 by taking the time P=15. During this time, the position command to the die cushion member 6 (servo motor Md) is held at the position (300−150=150) previously commanded.

When the execution of the command in the block of the sequence number N3 is terminated, the position command/pressure command processing unit 14 of the numerical control unit 10 starts the execution of the command in the block of a sequence number N4, and executes the distribution processing that moves up to the lowest point (position X5) of the top mold 1 at the speed 240000 (the maximum speed). When the execution of the command in the block of this sequence number N4 is terminated, an auxiliary function M200 in the command in the block of a sequence number N5 is executed, and in this state, the processing is put into a waiting state until a FIN signal returns.

After that, the top mold (press axis) 1 reaches the lowest point, and the die cushion member 6 also reaches the lowest point, and in the vicinity of time c (see FIG. 8) at which the top mold 1 starts elevating, the position deviation becomes "0" or an extremely small value. Consequently, the control is switched over from pressure control to position control, and the die cushion member 6 (servo motor Md) is held at the commanded position (X5), and is put into a stopped state.

When the top mold 1 goes up and the passage of the top mold 1 is detected by the sensor 7 at time d, and as a result, when the FIN signal is returned, the command in the block of the next sequence number N6 is executed. Here, the position command/pressure command processing unit 14 performs the distribution processing of the position so as to move toward the position of X=300, which is the press starting position, at the speed F=500, and outputs its position command to the servo control unit 20. At this time, the top mold 1 is rising, and is separated from the sheet metal 3, the bottom mold 2 and the die cushion member 6. Hence, in the servo control unit 20, the pressure deviation is great and the position deviation is small, and therefore, the speed command Ca (<Cb) by position control is adopted, and position control is executed. The die cushion member 6, as shown in FIG. 8, is positioned and held at the initial press starting position (X300), and in that state, the processing of the NC program is terminated (M30).

If the NC program of this FIG. 7 is executed and the servo motor Md driving the die cushion member 6 is controlled, the operation as described above can be performed, and therefore, as shown in FIG. 9, the pressure applied to the sheet metal 3 and the like can be prevented from becoming an overpressure. As a result, the time required for reaching the target pressure can be made shorter to some extent than the case of FIG. 6. However, since the command in the block of the next sequence number N3 is not executed until the processing of the block of the sequence number N2 is terminated, a time as shown by T3 in FIG. 9 is required before the target pressure is reached. That is, a wasteful time T3 is required until the target pressure is reached after the control is switched to pressure control.

When a second moving material body comes close and collides against a first moving material body, a displacement occurs in the colliding position. That is, when the top mold 1 (press axis) moves and comes close and collides against the moving die cushion member 6 and the sheet metal 3, a displacement occurs at that colliding position. As described above, when the second moving material body collides against the first stopped material body, there arises a problem that the pressure is applied too much. However, when the die cushion member 6 and the sheet metal 3 are caused to collide against the top mold (press axis) 1 which is approaching, while they are being moved to escape for avoiding the above problem, a displacement occurs in the colliding position. Consequently, to ensure an occurrence of collision of the die cushion member 6 and the sheet metal 3 with the top mold (press axis) 1 while they are being moved, it is necessary to command a movement amount sufficient for escape (movement amount commanded by the block of the sequence number N2). However, if this movement amount is large, it takes time to perform distribution processing of this movement amount to complete the processing of the command block, and as a result, it requires time before the next command is executed (command to the target pressure is outputted). Accordingly, during a period until the distribution processing of the escape amount to allow the die cushion member 6 to escape is terminated, a time T3 is required for controlling pressure to the target pressure as shown in FIG. 9.

SUMMARY OF THE INVENTION

Hence, an object of the present invention is to provide a numerical controller and numerical control method allowing to begin to execute a next command immediately after switchover from position control to pressure control.

To achieve the above described object, the numerical controller according to the present invention comprises a servo control that controls a servo motor, and a numerical control unit that outputs a position command and a pressure command to the servo control unit based on a NC program. The servo control unit comprises: comparing means for comparing a command obtained by performing a feedback control of a pressure with a command obtained by performing a feedback control of a position; control switching means for automatically switching pressure control or position control according to the comparison result of the comparing means and controlling the servo motor; and informing means for determining whether the servo control unit is currently in the midst of position control or pressure control, and informing the numerical control unit of the determination result. And the numerical control unit comprises switching execution means for terminating the operation of a movement command halfway when informed of switchover to pressure control by the servo control unit in the midst of execution of the movement command to which a command for switching to pressure control is added, and then starting execution of the next command of the NC program.

In synchronized operation in which a first axis is synchronized with the speed of a second axis and the movement command of the first axis is outputted to the servo control unit by a value corresponding to the moving speed of the second axis, the synchronized operation may be terminated when switched to pressure control by the control switching means, and the execution of the next command in the NC program may be started.

The switching execution means may be configured to either cancel the remaining movement amount of the command under execution or output the remaining movement amount of the command under execution to the servo control unit all at once, according to selection.

The numerical control unit may further comprise means for obtaining a command movement amount based on the movement amount according to the movement command outputted to the servo control unit after switchover to pressure control and a target position for switchover to position control from pressure control, and outputting the movement command of the obtained command movement amount to the servo control unit, and the switchover to position control from pressure control may be automatically performed in the vicinity of the target position.

The switching execution means may execute the movement command of the command movement amount up to the target position for switchover to position control from pressure control, and outputs the remaining movement amount all at once to the servo control unit when terminating the operation of the movement command halfway.

A numerical control method of the present invention is a method of switching between a position control and a pressure control by a numerical controller which comprises a servo control unit comparing a command obtained by performing a feedback control of pressure with a command obtained by performing a feedback control of position and automatically switching a control to pressure control or position control based on the comparison result to control the servo motor, and a numerical control unit for outputting a position command and a pressure command to the servo control unit based on a NC program. In this numerical control method, the numerical control unit outputs a movement command, together with the pressure command, to the servo control unit, and the numerical control unit terminates halfway an operation of the movement command currently under execution when switched to pressure control from position control under execution in the servo control unit, and executes the next command.

A first axis may be synchronized with the speed of a second axis, and the movement command of the first axis may be outputted to the servo control unit by a value corresponding to the moving speed of the second axis.

The movement command of movement amount up to a target position for switchover to position control from pressure control may be outputted, and the operation of the movement command may be terminated halfway when switched to pressure control from position control, and after that, the remaining movement amount may be outputted to the servo control unit all at once.

The command movement amount may be obtained based on the movement amount according to the movement command outputted to the servo control unit and the target position for switchover to position control from pressure control after switched to pressure control, and the movement command of the command movement amount thus obtained may be outputted to the servo control unit.

According to the present invention, when a control target is controlled by switching from position control to pressure control by the numerical controller, the next command can be executed immediately after the switching, with the result that a wasteful time can be saved and a highly accurate pressure control can be performed and also a cycle time can be shortened.

BRIEF DESCRIPTION OF THE DRAWINGS

The above and other objects and features of the present invention will become more apparent from the following detailed description of the embodiment with reference to the accompanying drawings, of which:

FIG. 3 is one example of a conventional NC program used for the control of the device press-fitting the part such as the pin into the workpiece;

FIG. 4 is an explanatory drawing of the operation according to the NC program shown in FIG. 3;

FIG. 5 is a schematic diagram of one example of a die cushion device in a press machine, wherein the numerical controller for die cushion is constituted by the numerical controller of one embodiment of the present invention;

FIG. 6 is a view showing a change in pressure generated at the moment a die cushion is let escape downward when a top mold collides against the die cushion member in the die cushion device in a conventional press machine;

FIG. 7 is an example of an NC program when controlling a pressure command by dividing it into two stages of a low pressure and a target high pressure when the top mold collides against a die cushion member;

FIG. 8 is a view representing a mutual relationship among a position of the top mold (press axis), a position command to the die cushion member, and an actual position of the die cushion member when the NC program shown in FIG. 7 is executed;

FIG. 18 is an explanatory drawing of the operation according to the program shown in FIG. 17;

FIG. 19 is an example of the NC program where the die cushion device in the press machine is controlled by the numerical controller according to the present invention;

FIG. 20 is a view showing the command pressure and the actual pressure (pressure feedback value) when the die cushion device in the press machine is controlled by the numerical controller according to the present invention;

FIG. 21 is an example of the NC program executed in another embodiment of the numerical controller of the present invention;

FIG. 22 is a view representing a mutual relationship among a position of the top mold (press axis), a position command to the die cushion member, and an actual position of the die cushion member when the NC program shown in FIG. 21 is executed;

FIG. 23 is a schematic diagram of another example of the die cushion device in the press machine, wherein the numerical controller for die cushion is constituted by the numerical controller of another embodiment of the present invention.

DETAILED DESCRIPTION OF THE PREFERRED EMBODIMENTS

Figure 10:
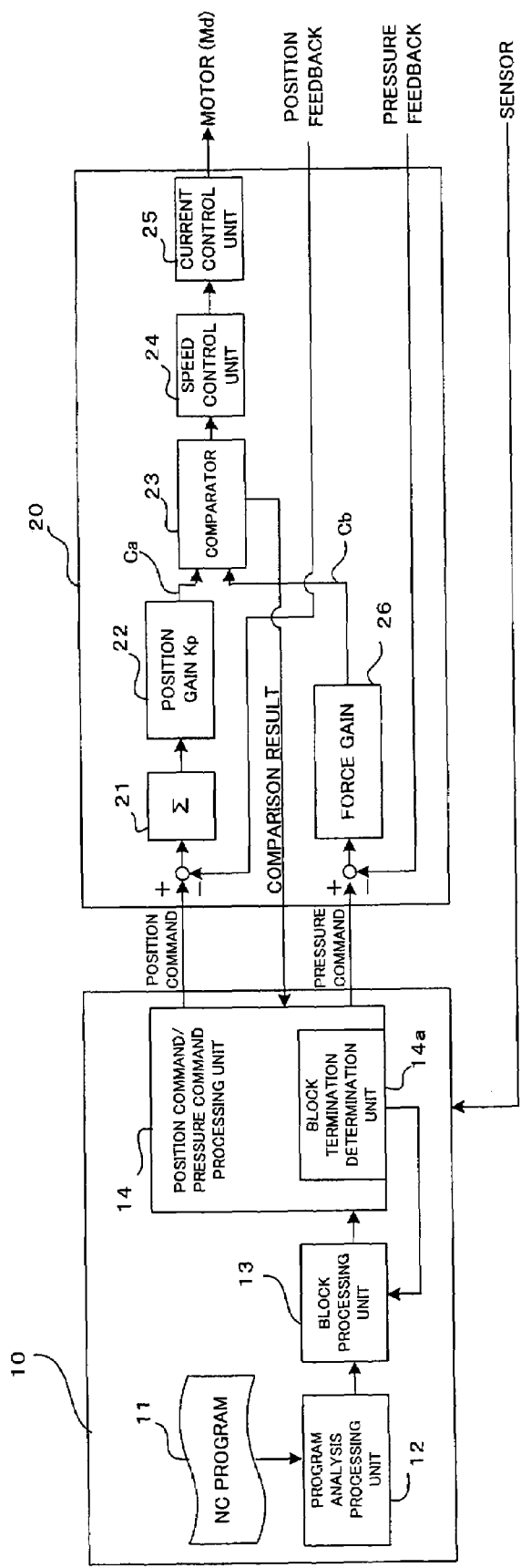
FIG. 10 is a schematic block diagram of one embodiment of the numerical controller according to the present invention.
Figure 11:
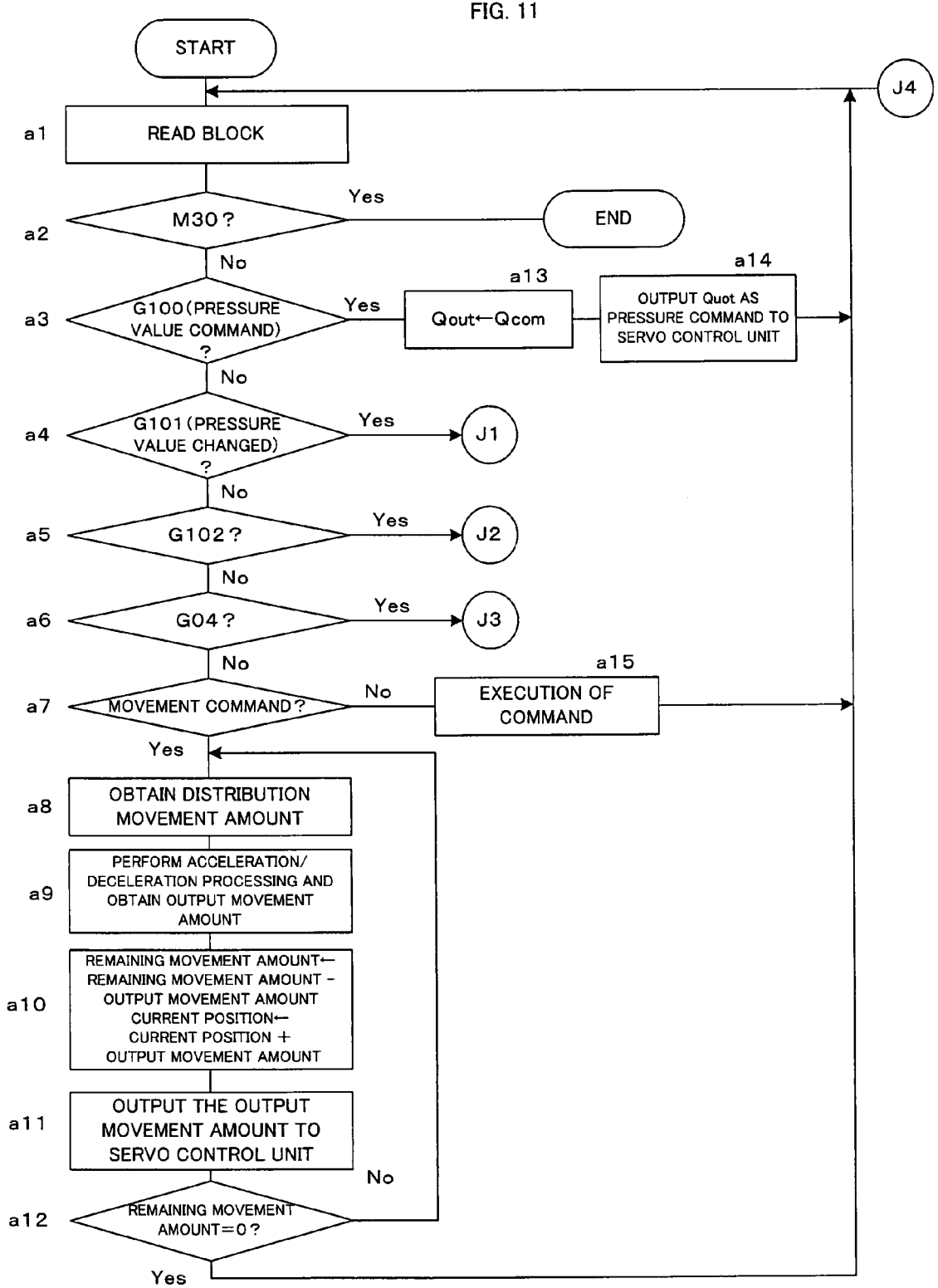
FIG. 11 is a flowchart showing an algorism of the switching control processing of position control and pressure control executed by the numerical controller of FIG. 10.
Figure 12:
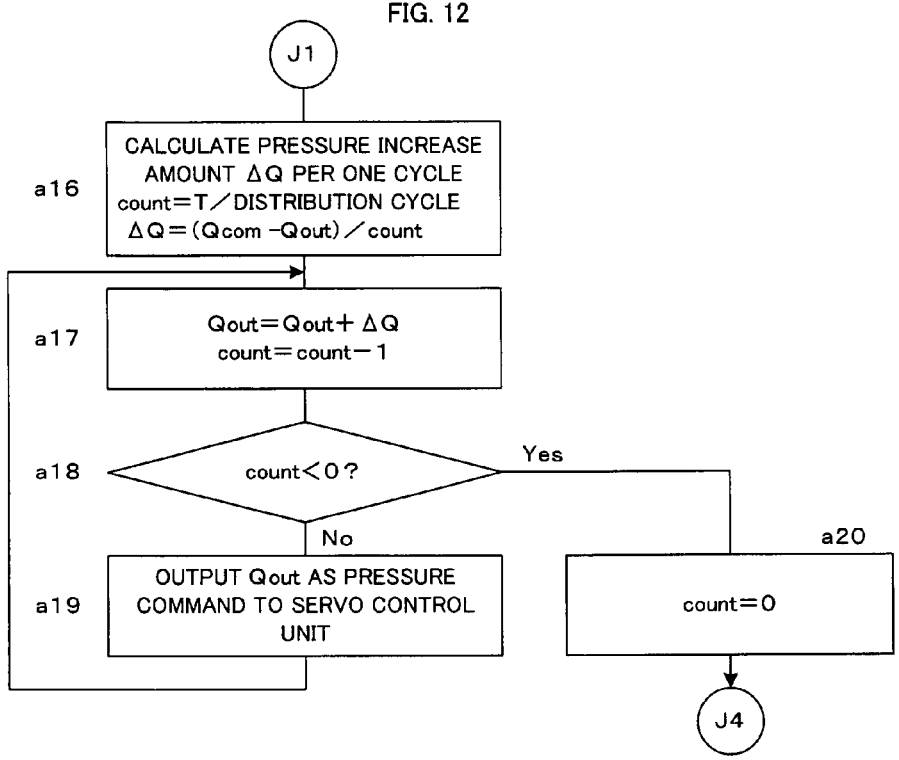
FIG. 12 is a continuation of the flowchart shown in FIG. 11.
Figure 13:
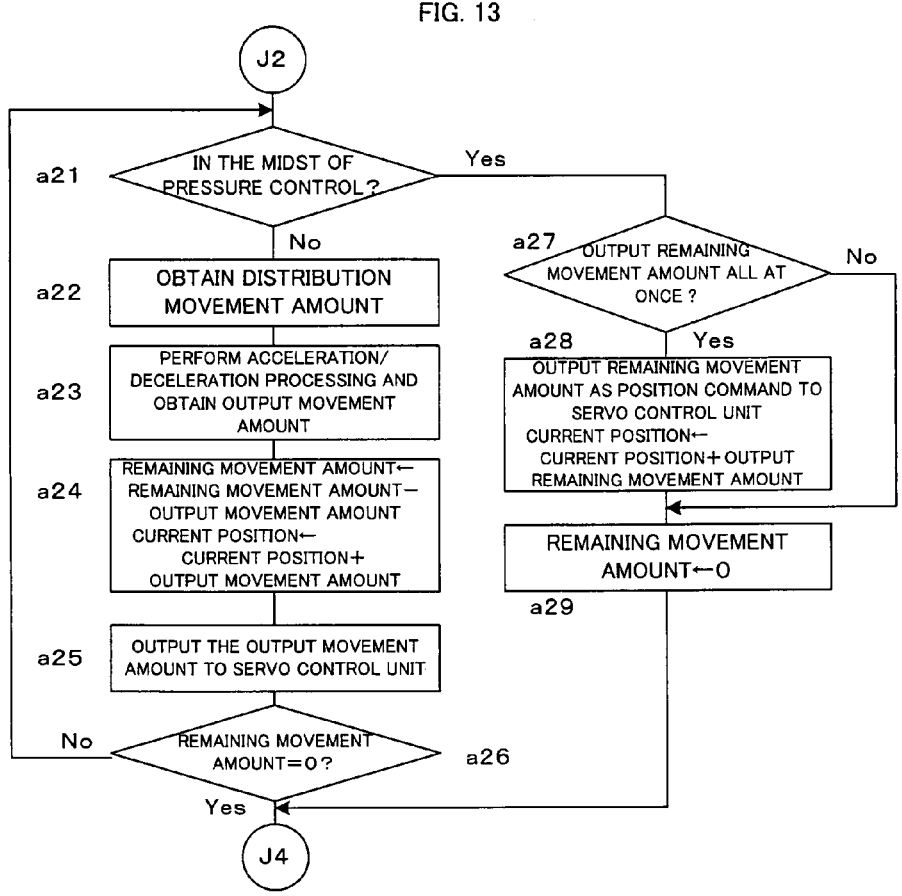
FIG. 13 is a continuation of the flowchart shown in FIG. 11.

FIG. 10 is a functional block diagram of a numerical controller of one embodiment of the present invention that allows position control and pressure control to be switched for execution.

Figure 2:
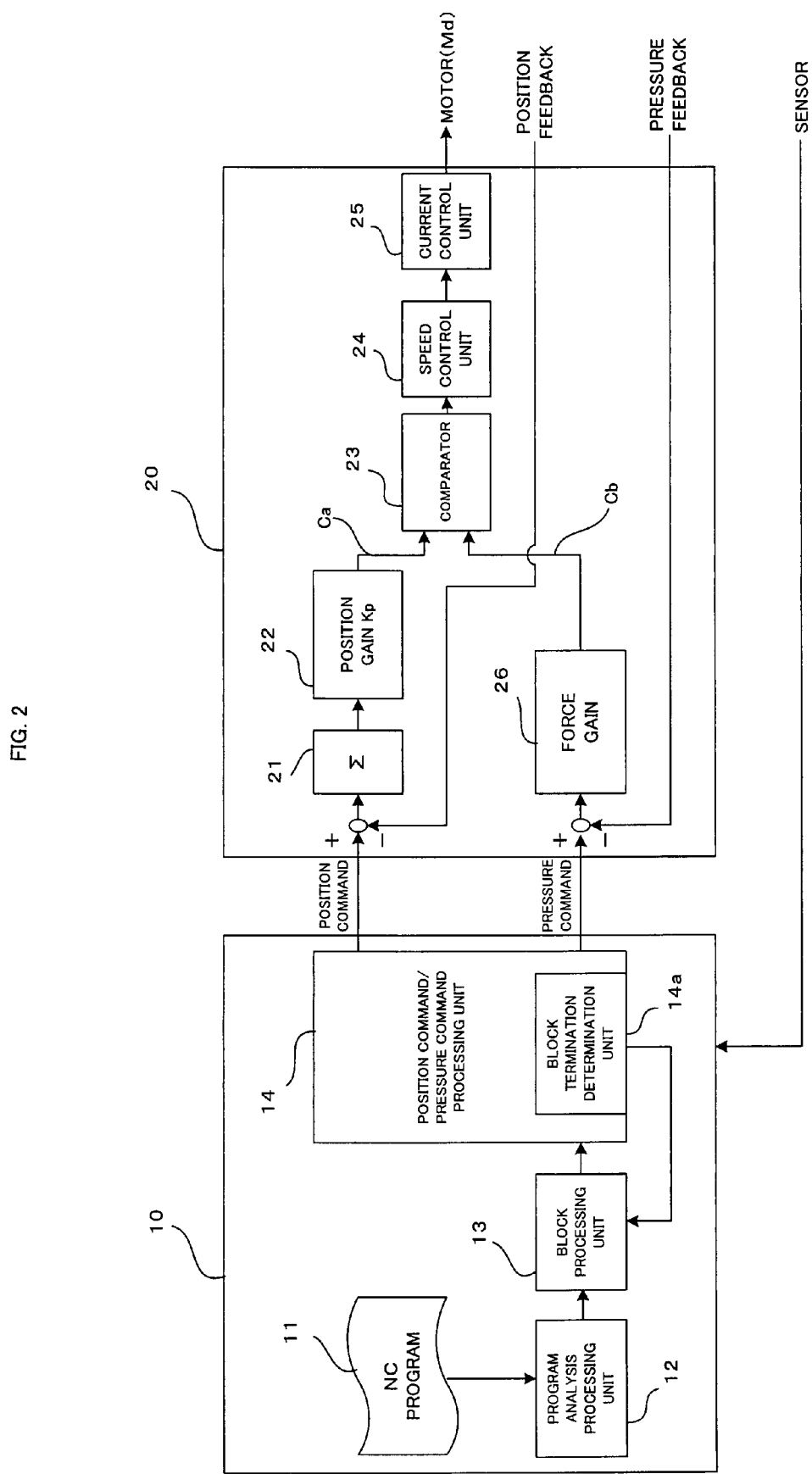
FIG. 2 is a schematic diagram of a conventional numerical controller capable of controlling by switching from position control to pressure control or vice versa.

The numerical controller shown in this FIG. 10 is the same as the conventional numerical controller shown in FIG. 2 in that a speed command Ca by position control and a speed command Cb by pressure control are compared with each other by a comparator 23, and a smaller speed command from among them is selected, and is switched to position control or pressure control for execution. However, the numerical controller shown in FIG. 10 is different from the conventional numerical controller shown in FIG. 2 in that (1) a comparison result (that is, a state as to whether position control is executed or pressure control is executed) compared by the comparator 23 is noticed to a numerical control unit 10, and (2) a position command/pressure command processing unit 14 of the numerical control unit 10, upon receipt of the signal of the 'comparison result' outputted from the comparator 23 and based on that signal, terminates halfway the distribution processing of a movement command by position control executed when the control is switched to pressure control in the midst of position control, and cancels the remaining movement command, and executes the command in the next block. Since this numerical controller shown in FIG. 10 is different from the numerical controller shown in FIG. 2 only in respect of the above (1) and (2), the component parts common to the numerical controller of FIG. 2 are attached only with the common drawing reference numerals, and the detailed description thereof is omitted.

Further, the NC program used for the numerical controller of FIG. 10 is provided with a command code which discontinues halfway the distribution processing of a movement command by position control, executed at the time when the control is switched to pressure control during position control, and proceeds to the execution of a command in the next block. The present embodiment takes this code as [G102]. Further, the present embodiment is provided with a code [G100] as a pressure command, a code [G101] as a command changing the pressure stepwise, and a dwell code [G04] as a code commanding pressure control time.

FIGS. 11 to 14 are flowcharts showing a algorism of the processing which a processor of the numerical control unit 10 in the numerical controller for switch-controlling position control and pressure control in the present embodiment allows the position command/pressure command processing unit 14 to execute.

The processor to execute the processing of the position command/pressure command processing unit 14 reads the command (converted into an analyzed execution data) in the block of the NC program from a block processing unit 13 (step a1), and determines whether the command in the read block is M30 of a program end command (step a2), G100 of pressure command (step a3), G101 of pressure change command (step a4), G102 of command letting the processing to proceed to the next block command by terminating it even during the execution thereof (step a5), G04 of dwell command (step a6), or any other conventional movement commands (step a7), and when the determination results are all No, the command in the block read in step a1 is executed similarly to the conventional processing (step a15).

On the other hand, when it is determined that the block command is a movement command in step a7, the movement amount for each distribution cycle is determined based on the contents (linear interpolation, arc interpolation, speed, target position, and the like) of the movement command commanded by this block (step a8), and an accelerating/decelerating processing is performed (step a9), and (1) a renewal processing of the remaining movement amount and (2) a renewal processing of the commanded current position is performed (step a10). In this renewal processing of remaining movement amount of (1), first, the movement amount commanded in this block is stored in a register for storing remaining movement amount, and after that, the output movement amount obtained in step a9 is subtracted from the remaining movement amount stored in this resister so that the remaining movement amount stored in the register is renewed. Further, in the renewal processing of current position of (2), the output movement amount obtained in step a9 is added to the current position stored in the resister, thereby renewing the position to be commanded to the servo control unit 20 by the numerical control unit 10.

Subsequent to the renewal processing in step a10, an output movement amount obtained in step a9 is outputted to the servo control unit 20 (step a11). Then, it is determined whether the current remaining movement amount is "0" or not (step a12), and when not "0", the processing returns to step a8. Subsequently, the processing in step a8 to step a12 are executed every distribution cycle, and the distribution movement amount is determined, and is subjected to the accelerating/decelerating processing, and the output movement amount for each distribution cycle is outputted to the servo control unit 20. When the remaining movement amount becomes "0", the processing returns to step a1.

The processing in step a15 and steps a7 to a12 are the same as the conventional processing.

On the other hand, when the read command is [G100], (determination result of step a3 is Yes), the processing in steps a13 and a14 are performed. When the read command is [G101] (determination result of step a4 is Yes), the processing (FIG. 12) in steps a16 to a20 is performed. When the read command is [G102] (determination result in step a5 is Yes), the processing (FIG. 13) in steps a21 to a29 is performed. Further, when the read command is [G04] (determination result of step a6 is Yes), the processing (FIG. 14) in steps a30 to a33 is performed.

Figure 1A:
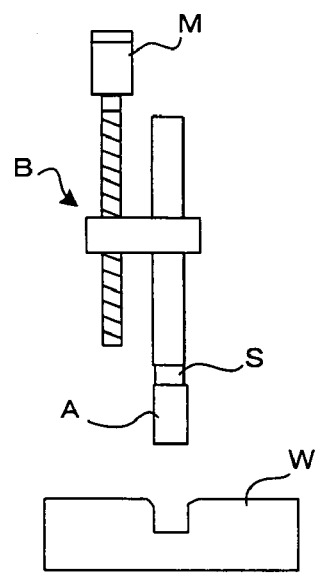
FIGS. 1A to 1C are explanatory drawings of the operation of a device in which a part such as a pin is press-fitted into a workpiece.
Figure 1B:
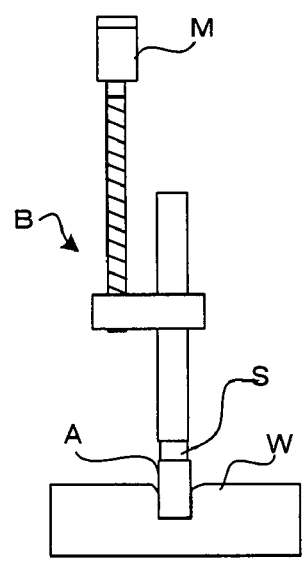
Figure 1C:
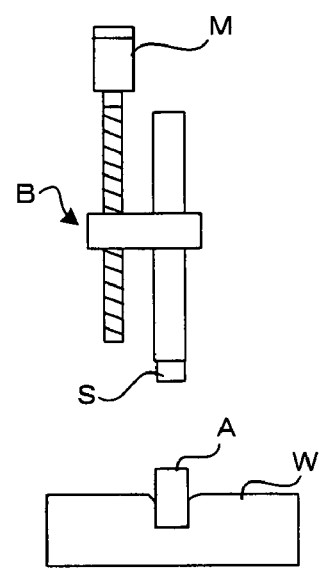

Hence, a case where the servo motor M of the device for press-fitting the part A such as a pin into the workpiece W, as shown in FIG. 1, by using the numerical controller of FIG. 10 capable of switching and executing position control and pressure control will be described below.

Figures 14, 15:
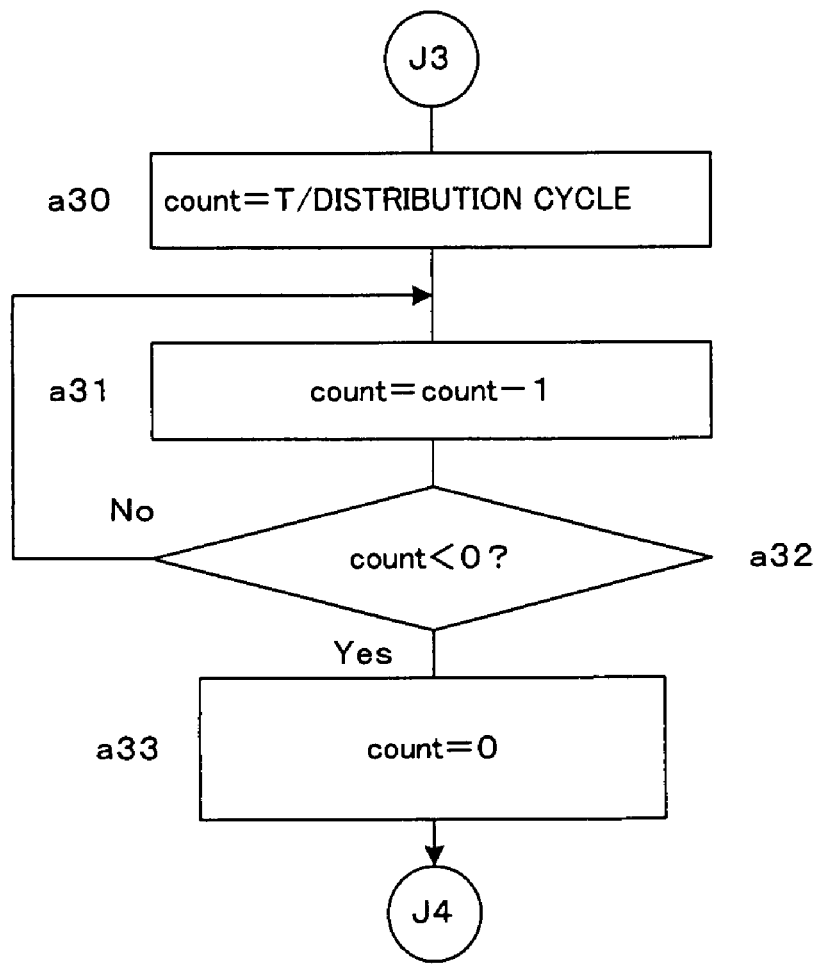
FIG. 14 is a continuation of the flowchart shown in FIG. 11.
FIG. 15 is a first example of the NC program when the device press-fitting the part such as the pin into the workpiece is controlled by the numerical controller of the present invention.

FIG. 15 is one example of the NC program for controlling this device. This NC program is different from the conventional NC program shown in FIG. 3 in a block of the sequence number N2. That is, the block of the sequence number N2 is [G90 G01 X30. F500;] in the case of FIG. 3, whereas it is changed to [G90 G102 X30. F500;] in the case of FIG. 15. This command [G102] is such that, when the signal showing that the control is switched over from position control to pressure control while executing the command in this block is inputted to the numerical control unit 10 from the comparator 23, the distribution processing of the movement command in this block is not executed till the last, but the processing of this block is terminated at the point of time when this signal is received, and the processing of the command in the next block is started.

More specifically, [G90 G102 X30. F500;] of the block of this sequence number N2 is a command for moving an X axis (die cushion axis) up to the position of 30 at a speed F500. According to the command, when the control is switched over from position control to pressure control during the distribution of this movement command, the distribution processing by the command in this block is immediately terminated, and the command in the next block is executed.

A program analysis processing unit 12 of the numerical control unit 10 reads every one block from the NC program and converts it into an executable data, and stores it in a block processing unit 13. The position command/pressure command processing unit 14 reads the data of one block from the block processing unit 13 (step a1), and as described above, determines whether it is M30 of program end command (step a2), G100 of pressure command (step a3), G101 of pressure change command (step a4), G102 of a command allowing to proceed to the processing of the command in the next block even in the midst of the execution of the current command (step a5), G04 of dwell command (step a6) or any other commands (step a7).

In the NC program of FIG. 15, at first, [G100 Q10] of the sequence number N1 is read, and therefore, the processing proceeds from step a3 to step a13, and a pressure [10] commanded (Q10) by this block is set (Qout=10) to a register for storing a pressure command Qout outputted to the servo control unit 20, and the pressure command Qout stored in the register is outputted to the servo control unit 20 (steps a13 and a14), and the processing returns to step a1. At this time, in the servo control unit 20, the servo motor M is held at a locating position at an operation starting time, and as a result, the position deviation becomes "0" or an extremely small value, and the speed command Ca by position control is "0" or a small value. On the other hand, though the pressure command Q(=10) is outputted, no pressure is applied to a pressure sensor S, and therefore, the pressure fed back from the pressure sensor S is "0" or a small value. Consequently, the pressure deviation is large, and the speed command Cb by pressure control, obtained by multiplying this pressure deviation by a gain, becomes a large value (Ca<Cb). As a result, the comparator 23 selects the speed command Ca by position control of a smaller speed command, and the servo control unit 20 executes position control.

The block of the next sequence number N2 is read out. Since the command in this block is [G102], the processing proceeds from step a5 to step a21, and the processor determines, based on the signal of a 'comparison result' transmitted from the servo control unit 20, whether or not the servo control unit 20 is currently in the midst of pressure control. As described above, since it is at first in the midst of position control (determination result in step a21 is No), the processing proceeds to step a22, and the processor obtains the movement amount for each distribution cycle based on the movement amount (movement amount to the die cushion axis (X axis)) [030] commanded by this block and the speed F(=500), and performs an acceleration/deceleration processing as to determine the output movement amount, and outputs this output movement amount to the servo control unit 20 (step a23 to a25). Further, the current position and the remaining movement amount is renewed, and the processor determines whether the renewed remaining movement amount become "0" or not (step a26). The processing of the steps a22 to a26 is the same as the processing in steps a8 to a12.

When it is determined that the remaining movement amount is not "0" at step a26, the processing returns to step a21, and the processor executes the processing in steps a21 to a26 every distribution cycle until the remaining movement amount is renewed to "0". During this time, the movement amount for each distribution cycle is obtained by the position command/pressure command processing unit 14 so as to move in a forward direction by 30 at the speed F=500, and is subjected to the accelerating/decelerating processing, and is outputted to the servo control unit 20.

The comparator 23 of the servo control unit 20 compares the speed command Ca by position control with the speed command Cb by pressure control. At first, as described above, the feedback value from the pressure sensor S is small, and as a result, the pressure deviation is large, so that the speed command Cb by pressure control is large. Further, since the servo motor M moves according to the command, the position deviation is small, so that the speed command Ca by position control is small (Ca<Cb). As a result, at first, position control is continuously executed.

The part A contacts the workpiece W, and the detection pressure fed back from the pressure sensor S increases, and this results in a reduction of the pressure deviation. Then, the part A is press-fitted into a hole of the workpiece W, and the movement of the servo motor M is decelerated and stopped, so that the position deviation increases. As a result, the speed command Ca by position control, obtained by multiplying the position deviation by a gain, becomes smaller than the speed command Cb by pressure control, obtained by multiplying the pressure deviation by a gain, (Ca>Cb), and the comparator 23 of the servo control unit 20 adopts the speed command Cb by pressure control, and switches to pressure control.

When the processor of the numerical control unit 10 detects the switchover to pressure control at step a21, the processing proceeds to step a27, and determines whether the remaining movement amount is set so as to be outputted all at once or not.

When it is determined at step a27 that the remaining movement amount is set so as to be outputted all at once, the remaining movement amount stored in the register at this point of time is outputted all at once to the servo control unit 20, and this outputted remaining movement amount is added to the register for storing current position, thereby performing the renewal of the current position (step a28), and the value of the register for storing remaining movement amount is set to "0" (step a29). When it is determined at step a27 that the remaining movement amount is not set to be outputted all at once, on the other hand, the value of the register for storing remaining movement amount is set to "0", without performing the processing in step a28 (without outputting the remaining movement amount) (step a29).

When it is determined that the remaining movement amount becomes "0" at step a26 or the value of the register for storing remaining movement amount is set to "0" at step a29, the processing returns to step a1, and the next block (the block of a sequence number N3) is read out, and the processing commanded by this read block is executed. More specifically, when switchover to pressure control is detected in the midst of control of the servo motor Md by position control according to the command in the block of the sequence number N2, the processing of the next block is immediately started, though in the midst of movement by the movement command in this block, At this time, the register for storing current position is stored with a position commanded from the numerical control unit 10 to the servo control unit 20. An error counter 21 of the servo control unit 20 is stored with this position commanded from the numerical control unit 10 to the servo control unit 20 and the position deviation which is a difference between this position and an actual position.

Since the command in the block of the next sequence number N3 is the command [G04] of the dwell to maintain a state of that time, the processing proceeds from step a6 to a30, and divides the time T (−250) commanded by a code P of this block by the distribution cycle, and obtains a distribution cycle count for completing a pressure increase, and stores it in the register (step a30), and 1 is subtracted from the distribution cycle count stored in the register (step a31). Then, it is determined whether the renewed distribution cycle count stored in the register becomes negative or not (step a32), and when the cycle count does not become negative, the processing in steps a31 and a32 is repeated every distribution cycle until the cycle count becomes negative.

When the distribution cycle count stored in the register becomes negative (determination result of step a32 is Yes), the register for storing the distribution cycle count is set to "0", and the processing returns to step a1. More specifically, the commanded pressure (commanded pressure Qout which is commanded by the block of the sequence number N1 and set in the register) is held for the time commanded by the block of the sequence number N3, and the servo control unit 20 performs a feedback of pressure control so as to coincide with this command pressure.

The commands in the blocks of sequence number N4 and subsequent numbers are the same as the conventional program example shown in FIG. 3. More specifically, the servo position deviation amount accumulated in an error register is read out by a variable #5101, and a value reversing a sign of the read servo position deviation amount is commanded to the servo control unit 20, thereby making zero the accumulated servo position deviation amount with the maximum speed (that is, 240000). As a result, the command position coincides with the actual position. Further, this movement command is added to the register for storing current position so as to renew the current position. Then, the block of a sequence number N5 is executed and processing returns to a waiting position (X100) with a position control. The relationship between the position and time and between the actual pressure and time when this program is executed is as shown in FIG. 16.

Figures 16, 17:
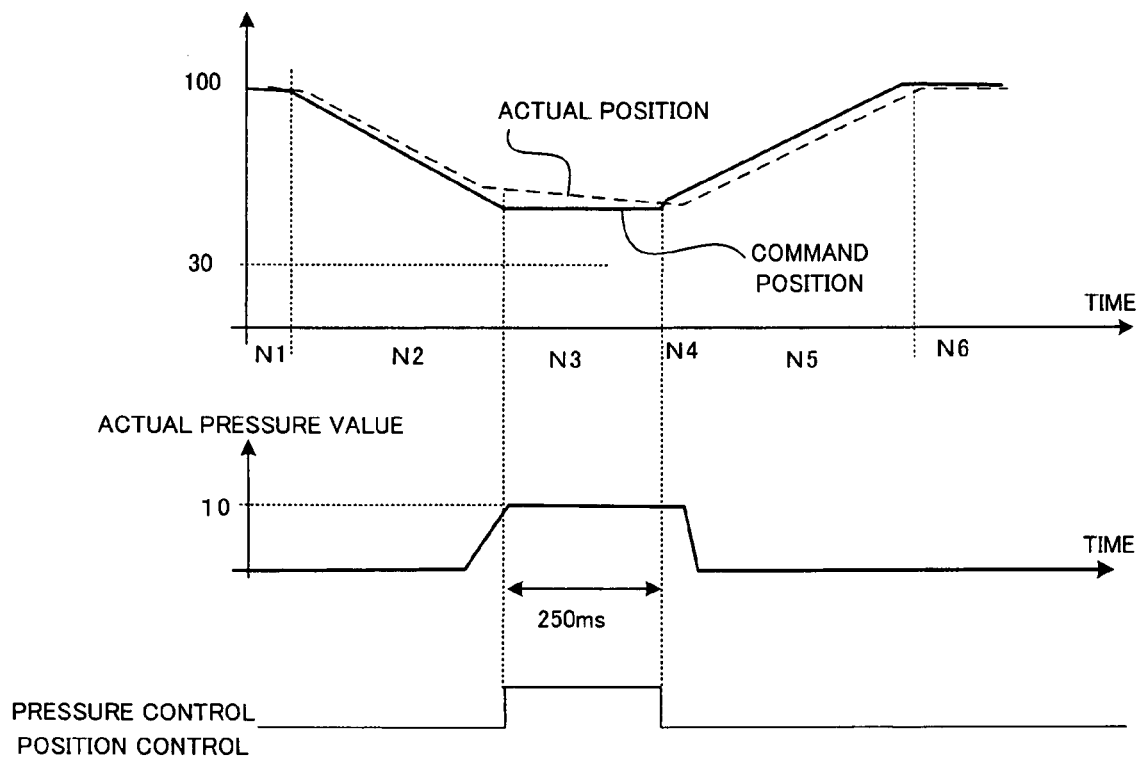
FIG. 16 is an explanatory drawing of the operation according to the program shown in FIG. 15.
FIG. 17 is a second example of the NC program where the device for press-fitting the part such as pin into the workpiece is controlled by the numerical controller of the present invention, wherein pressure controls of two stages are executed according to this program.
Figure 24:
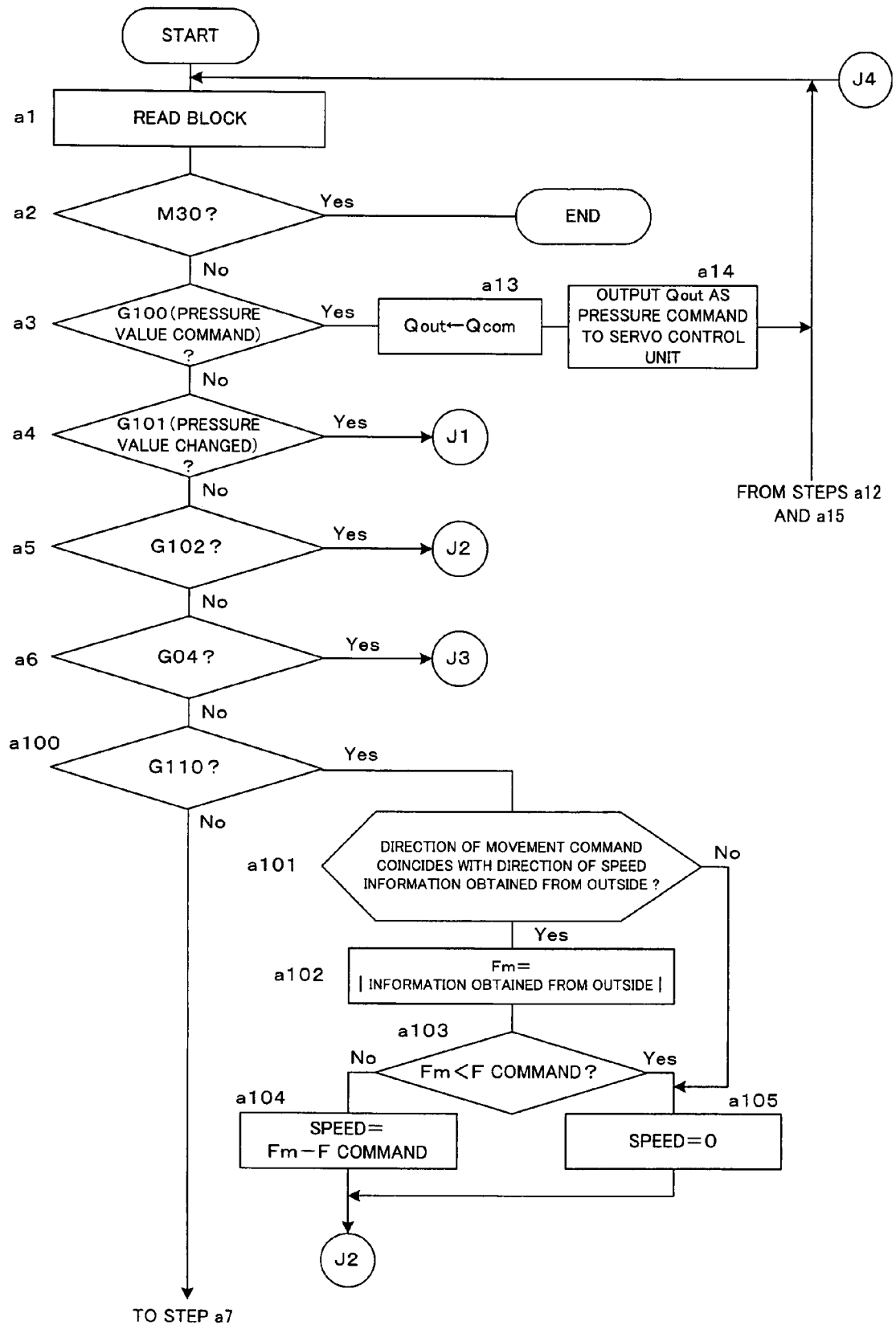
FIG. 24 is a part of the flowchart showing the algorism of switching control processing of position control and pressure control according to another embodiment of the numerical controller according to the present invention which controls the speed of the die cushion member in the die cushion device in the press machine shown in FIG. 23, in synchronization with of the speed of the top mold.

As evident from the comparison of this FIG. 16 with FIG. 14 of the conventional example, when switched to pressure control during position control, the numerical control unit cancels the remaining movement amount in the command in the block (block of the sequence-number N2) under execution so as to terminate the execution of the block and execute the command in the next block. Accordingly, wasteful and unintended time T4 as shown in FIG. 4 is eliminated, and the control to hold the pressure in the target pressure can be performed during 250 milliseconds of the target time, commanded by the next block with [P250].

Thus, according to the present embodiment, pressure control time can be accurately controlled. Further, the extra time such as time T4 shown in FIG. 4 can be eliminated, and this can contribute to the shortening of the cycle time.

As described above, according to the present embodiment, the time for which pressure is being held to a target pressure can be accurately controlled, as a result, the target pressure may be divided into a plurality of stages so that pressure is controlled with respect to a target pressure at each stage for a commanded time.

The NC program of FIG. 17 is an example of controlling a pressure by dividing the target pressure into two stages, and is equivalent to the addition of two blocks of sequence numbers N31 and N32 between the sequence numbers N3 and N4 in the NC program of FIG. 15.

After switched to pressure control and held in the command pressure (target pressure) (Q10) by time 250 milliseconds by the sequence number N3, the command in the block of the sequence number N31 is executed (steps a1 to a3, a13, and a14), and then, the command in the block of the sequence number N32 is executed (steps a1 to a6, and steps a30 to a33). According to these commands in the blocks of the sequence numbers N31 and N32, pressure is controlled for times set respectively for each of two stages divided, by holding pressure to the command pressure (target pressure) (Q20) for time 200 milliseconds.

In case of a system where a smaller speed command from among a speed command determined by position control and a speed command determined by pressure control is adopted for switching between position control and pressure control, as in the case of this embodiment, the servo control unit 20 is switched to pressure control according to the block of the sequence number N2, and in consequence, the numerical control unit cancels the remaining movement amount of the block of the sequence number N2 under execution. At this time, the speed command determined by position control falls below the speed command determined by pressure control when pressed in for increase of pressure according to the block of the sequence number N31, with the result that the servo control unit 20 returns to position control. In this case, it is impossible to obtain a desired pressure (Q20).

In such a case, the movement command value in the block of the sequence number N2 is set slightly larger, and selected is a mode in which the remaining movement amount of the block of sequence number N2 which is being executed by the numerical control unit 10 is outputted all at once to the servo control unit 20 when the servo control unit 10 is switched to pressure control. In short, a mode in which the determination result of step a27 of FIG. 13 becomes Yes is selected in this case. By so doing, the processing in steps a27 and a28 is executed, and a sufficient servo position deviation amount is accumulated, and as a result, the speed command determined by position control becomes large, and the servo control unit 20 continues pressure control without returning to position control, even when pressed in for increase of pressure according to the block of the sequence number N31, with the result that a desired pressure (Q20) can be obtained.

FIG. 18 is a view showing the relationship between time and position and the relationship between time and actual pressure in the case where the NC program shown in FIG. 17 is executed and the servo control unit 20 is switched to pressure control according to the block of the sequence number N2 so that the remaining movement amount of the block of the sequence number N2 which is being executed by the numerical control unit 10 is outputted to the servo control unit 20 all at once.

In case where this pressure control is divided into a plurality of stages, the change (increase or decrease) in the commanded pressures may be gradual, rather than at a stroke. When the command pressure is gradually changed, a code [G101] is used. For example, in the NC program shown in FIG. 17, the command in the sequence number N31 is set as [G101 Q20 P5], thereby gradually raising the command pressure up to Q20 by taking five milliseconds. Incidentally, this will be described in detail by an example in which the present invention is applied to the next die cushion device.

Next, an embodiment will be described of the case where the present invention is applied to the control of the servo motor Md which drives the die cushion member 6 of the die cushion device of the press machine shown in FIG. 5. In this embodiment, the numerical controller shown in FIG. 10 is used for a numerical controller 5 for die cushion shown in FIG. 5.

Further, the NC program for die cushion control according to the present embodiment is a program shown in FIG. 19. The NC program shown in this FIG. 19 is different from the conventional NC program shown in FIG. 7 in that the command in the block of the sequence number N2 is [G01 G91 X-150. F500;] in the case of the NC program shown in this FIG. 19 while the command in the block of the sequence number N2 is [G102 G91 X-150. F500;] in the case of the conventional NC program shown in FIG. 7.

In a state where a sheet metal (workpiece) 3 is mounted on the die cushion member 6 which is positioned (for example, at a press starting position of a position 300), the top mold (press axis) comes down. The sensor 7 detects the fact that the top mold (press axis) 1 reaches the predetermined position immediately before abutting against the metal sheet (workpiece) 3. When the numerical controller 5 receives this detection signal from the sensor 7, it starts executing the NC program shown in FIG. 19.

The program analysis processing unit 12 of the numerical control unit 10 reads one block each from the NC program, converts it into an execution data and stores it in the block processing unit 13. The position command/pressure command processing unit 14 reads out the data of one block from the block processing unit 13, and as described above, and determines whether it is [M30] of program end command (step a2), G100 of pressure command (step a3), G101 of pressure change command (step a4), G102 of command which allows the processing to proceeds to the execution of the command in the next block even in the midst of execution of the current command (step a5), G04 of the command representing the period for holding the pressure (step a6) or any other movement commands (step a7).

In the NC program shown in FIG. 19, since at first the command of [G100 Q10] of the sequence number N1 is loaded, the determination result of step a3 becomes Yes, and the processing proceeds from step a3 to step a13, and the pressure "10" commanded (with 'Q10') by this block is stored in the register for storing the pressure command Qout (Qout=10). In consequence, the stored pressure command Qout is outputted to the servo control unit 20 (steps a13 and a14), and the processing returns to step a1.

At this time, in the servo control unit 20, the servo motor Md driving the die cushion member 6 is held at a commanded locating position, and the position deviation is "0" or a very small value, and the speed command Ca by the position command is "0" or a small value. On the other hand, though the output command Q(=10) is also outputted, since the top mold (press axis) is not abutted against the sheet metal (workpiece) 3, the die cushion member 6 and the bottom mold 2, the value fed back from the pressure sensor 4 is "0" or a small value. As a result, the pressure deviation becomes large, and hence, the speed command Cb by pressure control, obtained by multiplying this pressure deviation by a gain, becomes a large value (Ca<Cb). Thus, the comparator 23 selects the smaller speed command Ca by position control, and the servo control unit 20 executes position control.

As the command in the block of the sequence number N2 to be read next is [G102], the determination result of step a5 becomes Yes, and the processing proceeds from step a5 to step a21. Then, it is determined, based on the signal of 'comparison result' transmitted from the servo control unit 20, whether the servo control unit 20 is in the midst of pressure control or not. As described above, as the servo control unit 20 is at first in the midst of position control (the determination result of step a21 is No), the processing proceeds to step a22, and the movement amount for each distribution cycle is obtained based on the movement amount commanded by this block (movement amount to the die cushion axis (X axis)) [-150] and the speed F (=500), and is subjected to the acceleration/deceleration processing, thereby obtaining the output movement amount. This output movement amount is outputted to the servo control unit 20, and moreover, the current position and the remaining movement amount is renewed, and then, it is determined whether the renewed remaining movement amount is "0" or not (step a26). The processing of these steps a21 to a26 is the same as the processing in steps a8 to a12.

When the renewed movement amount is not "0", the processing returns to step a21, and the processing in steps a21 to a26 is executed every distribution cycle until the remaining movement amount is renewed to "0". During this time, the movement amount for each distribution cycle is obtained so as to move by 150 in a negative direction (downward) at the speed F=500, and is subjected to the acceleration/deceleration processing, and is outputted to the servo control unit 20.

The comparator 23 of the servo control unit 20 compares the speed command Ca by position control with the speed command Cb by pressure control. Since at first, the top mold 1 does not abut against the sheet metal 3, the feedback value from the pressure sensor 4 is small, and as a result, the pressure deviation is large, and hence the speed command Cb is large. Further, since the servo motor Md driving the die cushion member 6 moves according to the command, the position deviation is small, so that the speed command Ca by position control is small (Ca<Cb). As a result, at first, position control is continuously executed.

However, since the lowering speed of the top mold (press axis) 1 is faster than the lowering speed F=500 of the cushion member commanded by the block of the sequence number N2, the top mold 1 catches up the sheet metal (workpiece) 3 and the die cushion member 6, and depresses the sheet metal 3, the die cushion member 6 and the bottom mold 2. As a result, the detected pressure fed back from the pressure sensor increases while the pressure deviation decreases. On the other hand, the die cushion member 6 is pushed down at the same speed as the lowering speed of the top mold (press axis) 1, and therefore, the speed of the servo motor Md becomes faster than the command speed, and as a result, the position deviation increases. Hence, the speed command Cb by pressure control, obtained by multiplying the pressure deviation by a gain, becomes smaller than the speed command Ca by position control, obtained by multiplying the position deviation by a gain, (Ca>Cb), and as a result, the comparator 23 of the servo control unit 20 adopts the speed command Cb by pressure control, and switches to pressure control.

When the processor of the numerical control unit 10 detects the switchover to pressure control at step a21, the processing proceeds to step a27, and the processor determines whether the remaining movement amount is set so as to be outputted all at once or not. When in a mode where remaining movement amount is set to be outputted all at once, the remaining movement amount stored in the register at this point of time is outputted all at once to the servo control unit 20, and moreover, the outputted remaining movement amount is added to the register for storing current position, thereby performing the renewal of the current position (step a28), and the value of the register for storing remaining movement amount is set to "0" (step a29). When in a mode where the remaining movement amount is not set to be outputted all at once at step a27, on the other hand, the value of the register for storing remaining movement amount is set to "0" without performing the processing in step a28 (without outputting the remaining movement amount), (step a29).

When it is determined that the remaining movement amount becomes "0" at step a26 or the value of the register for storing remaining movement amount is set to "0" at step a29, the processing returns to step a1, and the next block (block of a sequence number N3) is read out, and the processing commanded by this read block is executed. More specifically, when it is detected that the control is switched to pressure control in the midst of controlling of the servo motor Md by position control according to the command in the block of the sequence number N2, the processing of the next block is immediately started, though in the midst of movement according to the movement command in this block.

At this time, the register for storing current position is stored with a position commanded from the numerical control unit 10 to the servo control unit 20. An error counter 21 of the servo control unit 20 is stored with the position deviation between the position commanded from the numerical control unit 10 to the servo control unit 20 and an actual position.

The command in the block of the next sequence number N3 is a command of [G101] which changes pressure command value, and the determination result of step a4 becomes Yes, and the processing proceeds from step a4 to step a16.

First, the pressure increase time T (=15) commanded by a code P of this block is divided by the distribution cycle, and a distribution cycle count for completing the pressure increase is obtained and is set to the register, and a pressure increase amount ΔQ per one distribution cycle for increasing the pressure, with this distribution cycle count, from the current command pressure Qout (=10) to the pressure Qcom (=100) commanded by this block is determined by the following formula (step a16).

$$\Delta Q = (Q\text{com} - Q\text{out})/\text{count}$$

Next, the pressure increase amount ΔQ is added to the current pressure command Qout stored in the resister to renew the pressure command Qout, and the renewed pressure command Qout is stored in the register. Further, subtracting 1 from the distribution cycle count stored in the register to renew the distribution cycle count, the renewed distribution cycle count is stored in the register (step a17). Then, it is determined whether the distribution cycle count stored in the register is a negative value or not (step a18), and when not a negative value, the pressure command Qout stored in the register is outputted to the servo control unit 20 (step a19).

As a control has already been switched to pressure control in the servo control unit 20, pressure control is performed according to the pressure command newly commanded. Subsequently, the processing in steps a17 to a19 is executed every distribution cycle until the distribution cycle count becomes negative value. When it is detected that the distribution cycle count becomes negative at step a18, the processing proceeds to step a20, where "0" is set to the register for storing distribution cycle count and the processing returns to step a1. At the point of time when the distribution cycle count becomes "0", the pressure command value outputted to the servo control unit 20 reaches Qout=100 of the command pressure [Q100] which is commanded in the sequence number N3.

Incidentally, by inputting a command for controlling a peripheral equipment and the like in the block of the sequence number N3 executed when the servo control unit 20 is switched to pressure control, a control of the peripheral equipment can also be performed at a point of time when switched to pressure control.

In FIG. 20, the broken line represents a command pressure in the present embodiment, and the solid line represents a pressure feedback value fed back from the pressure sensor 4.

Figure 9:
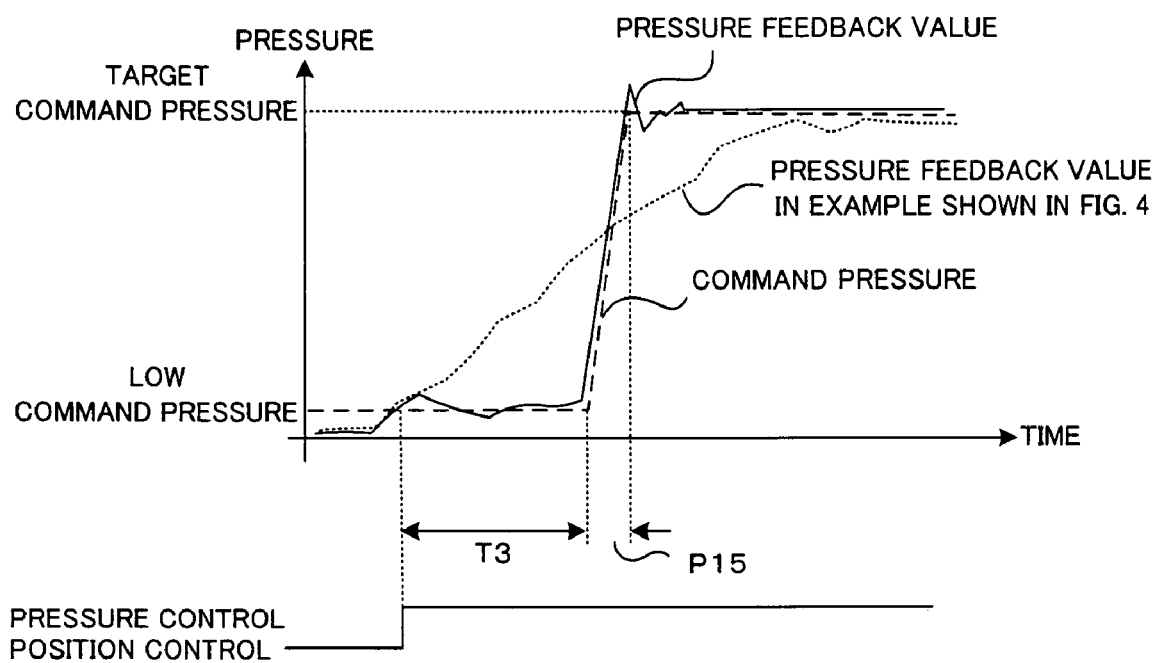
FIG. 9 is a view showing a command pressure and the actual pressure (pressure feedback value) when the NC program shown in FIG. 7 is executed.

As shown in this FIG. 20, when control is switched from position control to pressure control in the servo control unit 20, the command pressure immediately begins to rise toward the target command pressure and reaches a target pressure Q (=100) at a point of time when the commanded time P (=15) has elapsed. According to the present embodiment, as evident from the comparison of this FIG. 20 with FIG. 9, the time required for reaching the target pressure is shortened.

Since the command [G01] in the block of the next sequence number N4 is an ordinal linear interpolation command, the determination result of step a7 becomes Yes, and the processing proceeds from step a7 to step a8, and the processing in step a8 and subsequent steps is executed. The command in this block is a command to move to the lowest point position X (=5) (absolute position) corresponding to the lowest point of the top mold 1 (press axis) at the speed 240000 (maximum speed). Consequently, the current position (position up to the current time, commanded to the servo control unit 20, stored in the register) is subtracted from the command position X (=5) to obtain the movement amount, and the movement amount for each distribution cycle is obtained based on the movement amount and the command speed (F240000), and the obtained movement amount for each distribution cycle is subjected to the acceleration/deceleration processing and is outputted as movement command.

When the remaining movement amount becomes "0", the processing returns to step a1, and an auxiliary function M200 of the command in the block of the next sequence number N5 is executed, and in this state, the processing is put into a waiting state until a FIN signal returns.

According to this embodiment, the commanded pressure is changed to a target high pressure from a low pressure by taking a predetermined setting time. However, even if pressure command of a target high pressure is issued immediately after shift to pressure control with a low pressure, it is possible to hold down an overshoot of pressure. In such a case, pressure command of the target high pressure may be issued immediately after the shift to pressure control with a low pressure.

After that, the top mold 1 reaches the lowest point, and the die cushion member 6 also reaches the lowest point, and since the position deviation becomes "0" or an extremely small value in the vicinity of the rising stating point of the top mold 1, the control is switched to position control, and the die cushion member 6 (servo motor Md) is kept at a commanded position X=5, and is put into a stopping state.

Once the top mold 1 reaches the lowest point, the top mold 1 rises with position deviation kept "0" or an extremely small value since an external force from the top mold 1 is not applied to the die cushion member 6. Hence, the speed command Ca by position control becomes smaller than the speed command Cb by pressure control, (Ca<Cb), and thus, the die cushion member 6 is held at this position X=5.

When the top mold 1 (press axis) rises, and the passage of the top mold 1 is detected by the sensor 7, and the signal FIN is returned, the command (movement command) of the block of the next sequence number N6 is executed. As the command is a movement command, the determination result of step a7 becomes Yes, and the distribution processing for movement to the position of X300, press staring position, at the speed F500 is performed by processing in steps a8 to a12, and the movement command is outputted to the servo control unit 20. At this time, the top mold 1 is rising, and is separated from the sheet metal 3, the bottom mold 2 and the die cushion member 6, and therefore, the pressure deviation is large and the position deviation is small in the servo control unit 20, with the result that the speed command Ca by position control is adopted and position control is executed. The die cushion member 6 is positioned and held at the initial press starting position x=300.

When the output of the movement command up to the initial press starting position X=300 is completed and the remaining movement amount becomes "0" (determination result of step a12 is Yes), the processing returns to step a1, and the command in the block of the next sequence number N7 is read out. The command in this block is [M30] which represents an end of program, and therefore, this is determined by step a2, and the processing of this NC program is terminated.

Incidentally, in the above described embodiment, the command to the target pressure is executed according to the command in the block of the sequence number N3 of FIG. 19, and the movement command to the switching position from pressure control to position control is execute. However, as shown in FIG. 21, with the command block of the sequence number N4 shown in FIG. 19 eliminated and the command in the block of the sequence number N2 being a movement command up to a switching position from pressure control to position control, the remaining movement amount which remains when switched to pressure control in the midst of execution of this block may be outputted all at once. The mutual relationship at this time among the top mold (press axis) 1, the die cushion command position and the die cushion actual position (actual position of the die cushion member 6) is as shown in FIG. 22.

Further, the pressure at the time of collision between the top mold 1 and the die cushion member 6 greatly depends on the relative speed between the top mold 1 and the die cushion member 6. That is, when the relative speed is high, the pressure at the time of collision is large, and on the contrary, when the relative speed is low, the pressure at the time of collision becomes small. The speed of the top mold 1 is changed by an overrun and the like, and therefore, for setting the relative speed constant so as to reduce a pressure fluctuation caused when the collision occurs, it is necessary to adjust the speed of the die cushion according to the speed of the top mold 1. In this case, the die cushion device is provided with a position/speed detector 8 for detecting the position and speed of the top mold (press axis) 1, as shown in FIG. 23, and the speed information on the top mold 1 is obtained from the position/speed detector 8, in stead of changing a program command according to the speed of the top mold 1. Then, the block of the sequence number N2 of FIG. 19 is set as follows. In this way, if operations of the top mold 1 is synchronized with the operation of the die cushion member 6, it will be easy to control them, since it is unnecessary to change the program according to speed.

N2 G110 G91 X-150. F250;

In case of the device in which the top mold operates at a speed equal to or more than the relative speed corresponding to a desired pressure at all times in execution of a program for such a synchronized operations, the relative speed corresponding to the desired pressure may be commanded.

In case of the device in which the top mold operates at a speed lower than the relative speed corresponding to a desired pressure and may collides, on the other hand, control is performed such that pressure command of a lower pressure is issued first, as described above in relation to the conventional art, and the pressure command is increased after switched to pressure control, thereby increasing the pressure. In such a case, since a commanded moving distance of the die cushion member 6 differs dependent upon the speed of the top mold 1, the moving distance to be commanded has to be a value equal to or more than the distance in which the top mold 1 and the die cushion member 6 collide against each other when the top mold 1 operates at the maximum speed. In this case, when the top mold 1 operates at a lower speed, the moving distance from the movement start of the die cushion member 6 until the collision becomes short, and the remaining movement amount after the collision becomes long, as a result, it takes a time to complete the execution of the command in the block for moving in synchronization subsequent to collision. For solving this problem, the synchronized operation is terminated when the servo control unit is switched to pressure control, and then, the processing proceeds to the execution of the command in the next block. More specifically, the processing for performing this synchronized operation is realized by replacing the processing of the processor of the numerical control unit 10 shown in FIGS. 11 to 14 with the processing shown in FIG. 24 and FIGS. 12 to 14. In other word, the determination as to whether the read command in the block is [G110] or not, and processing at steps a100 to a105 corresponding to this command [G110] are added.

When the command of [G110] is read (step a100), the processor at first determines whether the speed information from the position/speed detector 8 coincides with the direction of the speed command F (F=250 in the case of the above described program example) commanded by the read block (step a101), and when it does not coincide with, the speed to be commanded is made "0" (step a105), and when it coincides with, the speed information taken from this position/speed detector 8 is made an external speed information Fm (step a102). Then, this external speed information Fm are compared with the speed (F=250) commanded by this block (step a103). As a result, when the external speed information Fm is larger than the speed F commanded by this block (Fm>F), the speed command is taken as (Fm−F) (step a104), and the processing proceeds to step a21. Here, the relative speed between the top mold 1 and the die cushion member is the speed F (=250) commanded by this block.

When the speed F commanded by this block is larger than the external speed information Fm (Fm<F), on the other hand, the speed command is made "0", and the processing proceeds to step a21. Consequently, the relative speed between the top mold 1 and the die cushion member 6 becomes the external speed information Fm smaller than the speed F commanded by this block. As a result, the relative speed between the top mold 1 and the die cushion member 6 becomes always smaller than the speed F commanded by this block, and in this state, the top mold 1 and the die cushion member 6 does not cause a large pressure when collision arises.

Incidentally, in each of the above described embodiments, a selection as to whether the remaining movement amount is cancelled or outputted all at once when the control is switched over from position control to pressure control is set in advance by a parameter and the like. In place of this, in the program example shown in FIGS. 19 and 21, for example, a command P0 for canceling the remaining movement amount and a command P1 for outputting the remaining movement amount at all at once may be provided in the command in the block of the sequence number N2. Furthermore, a code of [G102] for canceling the remaining movement amount and a code [G103] for outputting the remaining movement amount all at once may be included in the command of the block of the sequence number N2 in the program of FIGS. 19 and 21 so that a selection can may be made as to whether the remaining movement amount is cancelled or outputted all at once.

Incidentally, in the above described embodiments, as a method of automatically switching from position control to pressure control or from pressure control to position control, the speed command Ca by the position feedback control and the speed command Cb by the pressure feedback control are compared with each other, so that the control is switched to the control in association with the smaller speed command. However, as disclosed in the Patent Document 3, the present invention can be applied to the case where the torque command determined by the position feedback control and the torque command (pressure feedback control gain is adjusted so as to correspond to the torque command) determined by the pressure feedback control are compared with each other by a comparator, and control (either position/speed control or pressure control) is automatically switched to the control in association with torque command which is smaller.

The invention claimed is:

1. A numerical controller, including a servo control unit that controls a servo motor, and a numerical control unit that outputs a position command and a pressure command to said servo control unit based on a NC program, said servo control unit, comprising:

comparing means for comparing a command obtained by performing a feedback control of a pressure with a command obtained by performing a feedback control of a position;

control switching means for automatically switching pressure control or position control according to the comparison result of said comparing means and controlling said servo motor; and informing means for determining whether the servo control unit is currently in the midst of position control or pressure control, and informing said numerical control unit of the determination result, and said numerical control unit, comprising:

switching execution means for terminating the operation of a movement command halfway when informed of switchover to pressure control by said servo control unit in the midst of execution of the movement command to which a command for switching to pressure control is added, and then starting execution of the next command of said NC program.

2. The numerical controller according to claim 1, wherein said comparing means compares a first speed command obtained by performing feedback control of pressure and a second speed command obtained by performing feedback control of position; and when said comparing means determines that said first speed command is smaller than said second speed command, said control switching means switches to pressure control to control the servo motor, and when said comparing means determines that said second speed command is smaller than said first command, on the other hand, said control switching means switches to position control to control the servo motor.

3. The numerical controller according to claim 1, wherein, in synchronized operation in which a first axis is synchronized with the speed of a second axis and the movement command of the first axis is outputted to said servo control unit by a value corresponding to the moving speed of the second axis, said synchronized operation is terminated when switched to pressure control by said control switching means, and the execution of the next command in the NC program is started.

4. The numerical controller according to claim 1, wherein said switching execution means can either cancel the remaining movement amount of the command under execution or output the remaining movement amount of the command under execution to the servo control unit all at once, according to selection.

5. The numerical controller according to claim 1, wherein said numerical control unit further comprises means for obtaining a command movement amount based on the movement amount according to the movement command outputted to said servo control unit after switchover to pressure control and a target position for switchover to position control from pressure control, and outputting the movement command of the obtained command movement amount to said servo control unit; and the switchover to position control from pressure control is automatically performed in the vicinity of said target position.

6. The numerical controller according to claim 1, wherein said switching execution means executes the movement command of the command movement amount up to the target position for switchover to position control from pressure control, and outputs the remaining movement amount all at once to the servo control unit when terminating the operation of the movement command halfway.

7. A numerical control method of switching between a position control and a pressure control by a numerical controller which comprises a servo control unit comparing a command obtained by performing a feedback control of pressure with a command obtained by performing a feedback control of position and automatically switching a control to pressure control or position control based on the comparison result to control the servo motor, and a numerical control unit for outputting a position command and a pressure command to said servo control unit based on a NC program, wherein:

said numerical control unit outputs a movement command, together with the pressure command, to said servo control unit; and said numerical control unit terminates halfway an operation of the movement command currently under execution when switched to pressure control from position control under execution in said servo control unit, and executes the next command.

8. The numerical control method of switching between a position control and a pressure control according to claim 7, wherein a first axis is synchronized with the speed of a second axis, and the movement command of the first axis is outputted to the servo control unit by a value corresponding to the moving speed of the second axis.

9. The numerical control method of switching between a position control and a pressure control according to claim 7, wherein the movement command of movement amount up to a target position for switchover to position control from pressure control is outputted, and the operation of the movement command is terminated halfway when switched to pressure control from position control, and after that, the remaining movement amount is outputted to the servo control unit all at once.

10. The numerical control method of switching between a position control and a pressure control according to claim 7, wherein the command movement amount is obtained based on the movement amount according to the movement command outputted to the servo control unit and the target position for switchover to position control from pressure control after switched to pressure control, and the movement command of the command movement amount thus obtained is outputted to the servo control unit.

* * * * *